United States Patent
Tr et al.

(10) Patent No.: US 12,340,332 B2
(45) Date of Patent: Jun. 24, 2025

(54) SYSTEMS AND METHODS FOR IDENTIFYING, QUANTIFYING, AND MITIGATING RISK

(71) Applicant: Accenture Global Solutions Limited, Dublin (IE)

(72) Inventors: Rajarajan Tr, Bangalore (IN); Auri Priyadharshini Munivelu, Bangalore (IN); Venkata Rama Krishna P, Chebrole (IN); Jhilam Dutta, Bangalore (IN); Ravi Kanth Vinnakota, Bangalore (IN); Sudhanshu Sharma, Bangalore (IN); Yash Mishra, Ajmer (IN)

(73) Assignee: Accenture Global Solutions Limited, Dublin (IE)

( * ) Notice: Subject to any disclaimer, the term of this patent is extended or adjusted under 35 U.S.C. 154(b) by 495 days.

(21) Appl. No.: 17/548,476

(22) Filed: Dec. 10, 2021

(65) Prior Publication Data
US 2023/0186213 A1    Jun. 15, 2023

(51) Int. Cl.
*G06Q 10/0635* (2023.01)
*G06F 16/215* (2019.01)
(Continued)

(52) U.S. Cl.
CPC ....... *G06Q 10/0635* (2013.01); *G06F 16/215* (2019.01); *G06F 40/242* (2020.01); *G06N 5/04* (2013.01)

(58) Field of Classification Search
CPC ........... G06Q 10/0635; G06Q 30/0201; G06Q 40/06; G06N 20/00; H04L 63/1433; G06F 40/30; G06F 16/9024; G06F 16/2228
See application file for complete search history.

(56) References Cited

U.S. PATENT DOCUMENTS 10,902,065 B1    1/2021  Merritt et al.
2020/0159830 A1*  5/2020  Mutalikdesai ........... G06N 5/01
(Continued)

FOREIGN PATENT DOCUMENTS

WO   WO-2017051425 A1 *  3/2017  ........... G06F 17/241
WO   WO-2019183371 A1 *  9/2019  ............. G06F 16/00

OTHER PUBLICATIONS

R. Gupta, et al., "Comparative study of classifier models for Crime Mitigation and Risk Modelling," 2019 Third International Conference on Inventive Systems and Control (ICISC), Coimbatore, India, 2019, pp. 346-350 <https://ieeexplore.ieee.org/document/9036416?source=IQplus> (Year: 2019).*

(Continued)

*Primary Examiner* — Jerry O'Connor
*Assistant Examiner* — Michael R Koester

(57) ABSTRACT

Aspects of the present disclosure provide systems, methods, and computer-readable storage media that support functionality for identifying, quantifying, and mitigating risks. A dataset that includes a plurality of data items associated with one or more entities is generated and a set of rules is executed against the dataset to determine a sentiment for each data item of the plurality of data items. The dataset may be evaluated against a machine learning model configured to produce a set of risk categorizations that associate each of the plurality of data items with a risk category. Scoring metrics are generated for each of the data items based at least in part on the evaluating. The scoring metrics may account for an impact of dependencies and capabilities of the one or more entities on risks corresponding to the risk categorizations. A data structure may be created and displayed to the user based on the scoring metrics, where the data structure is configured to quantify risks identified for each of the (Continued)

entities and to identify actions configured to mitigate the risks for each entity.

17 Claims, 10 Drawing Sheets

(51) Int. Cl.
    *G06F 40/242* (2020.01)
    *G06N 5/04* (2023.01)

(56) References Cited

U.S. PATENT DOCUMENTS

| | | | |
|---|---|---|---|
| 2021/0026835 A1* | 1/2021 | Pai | G06F 40/295 |
| 2021/0065223 A1* | 3/2021 | Blecha-Ward | G06Q 30/0203 |
| 2021/0200955 A1* | 7/2021 | Ben Kimon | G06N 3/044 |
| 2023/0103840 A1* | 4/2023 | Yeddu | G06F 40/284 |
| | | | 714/57 |

OTHER PUBLICATIONS

Joseph, Harry Raymond, "Poster: Software Development Risk Management: Using Machine Learning for Generating Risk Prompts," 2015 IEEE/ACM 37th IEEE International Conference on Software Engineering, May 2015, 2 pages.

Intellectual Property of India, Government of India, Examination Report issued for Indian Patent Application No. 202244066985, dated Aug. 4, 2023, 6 pages.

* cited by examiner

SYSTEMS AND METHODS FOR IDENTIFYING, QUANTIFYING, AND MITIGATING RISK

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

The present disclosure relates generally to systems for mitigating risk and more specifically to systems for leveraging artificial intelligence to identify, quantify, and mitigate risks.

BACKGROUND

Technological advancements have resulted in many changes to the way businesses and individuals communicate and cooperate. For example, many years ago a manufacturer may produce products entirely in-house, but due to technology advancements with respect to the manufacture and transport of goods, as well as capabilities to share data, a significant portion of manufacturing is performed in a distributed manner (e.g., a manufacturer may assemble a final product using components sourced from many third party suppliers). While this type of distributed manufacturing has had a positive impact in many ways, such as reducing costs, improved reliability (e.g., due to more specialized manufacturing processes), and other factors, it has also resulted in some drawbacks. For example, reliance on third party manufacturers, third party suppliers, or other types of third parties has created an increased exposure to risk (e.g., financial and non-financial risk) for the entities that rely on those third party actors.

Presently, techniques to assess third party risk are performed based on data that may be sufficient for providing an abstract view of third party actors and associated risks, but that is insufficient to properly assess particular types of risks or how risk factors may interact with each other (e.g., dependencies). The individualistic nature of existing techniques makes it difficult to see how risks may impact capabilities of the third party actor or other entities, such as how risks may impact operational capabilities, strategic objectives, compliance, reputation, or other aspects of an entity and its operations. Furthermore, the available data utilized by existing techniques, such as financial data, while potentially providing insights into certain characteristics of an entity, is typically insufficient to enable a real-time analysis of third party risk. To illustrate, utilizing financial data to evaluate an entity may enable a determination to be made as to whether the entity is profitable or financially stable, which may provide insights into the risk that the entity stays in business, but financial data utilized in such analysis is not readily available (e.g., in real-time) and is instead provided on a periodic basis (e.g., once per quarter, etc.), thereby providing information that looks back in time, rather than a current snapshot of the entity or state of the entity.

When data is provided on such a periodic basis it may be impossible to obtain real-time assessment of third party risk, which minimizes the value of any risk assessments performed based on such data and limits the ability of the entity performing the risk assessment from taking meaningful actions to mitigate any identified risks (e.g., a risk identified based on performance data from the past three months may be insufficient to take action and respond to a risk that occurs today or this week). For example, financial data used in current risk assessment techniques may be provided periodically and due to the periodic nature of such data (e.g., balance sheets, etc.) the risk assessments can only be performed at a frequency at which the financial data is issued. This means that any given risk assessment will remain unchanged until the next set of data is made available, which is problematic because factors that impact risk may change more frequently than the frequency at which financial data is made public by an entity. Additionally, the data used in existing third party risk techniques does not include information that enables capabilities of an entity to be evaluated (e.g., can a supplier increase production, make customizations, speed up delivery, etc.) or dependencies between different aspects of an entity and identified risks (e.g., dependencies between a supplier's production capabilities and a shipper's ability to pick up and deliver products produced by the supplier or for a vendor to provide components to the supplier for use in producing products).

SUMMARY

Aspects of the present disclosure provide systems, methods, apparatus, and computer-readable storage media that support functionality for identifying, quantifying, and mitigating risks. A dataset that includes a plurality of data items associated with one or more entities is generated. The dataset may be generated automatically or at the request of a user. For example, a user may initiate an analysis process with respect to one or more entities and a dataset may be generated by retrieving data related to the one or more entities from one or more data sources. Additionally or alternatively, the user may configure a monitoring process for monitoring risk associated with the one or more entities. When monitoring is configured (or as an optional feature for maintaining a fresh dataset available for on-demand risk analysis (e.g., without requiring retrieval of data)), the data may be periodically retrieved automatically.

A set of rules may be executed against the dataset to determine a sentiment for each data item of the plurality of data items. In an aspect, the set of rules may include a dictionary of terms that may be used to associated each data item with a sentiment category (e.g., positive, neutral, or negative sentiment). The set of rules may also provide for reducing the dataset based on the sentiment of the data items. The dataset (or reduced dataset) may be evaluated against a machine learning model configured to produce a set of risk categorizations that associate each of the plurality of data items with a risk category. Scoring metrics are generated for each of the data items based at least in part on the evaluating. The scoring metrics may account for an impact of dependencies and capabilities of the one or more entities on risks corresponding to the risk categorizations. For example, the risk categories may be associated with various parameters and the data items may be scored based on the risk categories and parameters based on the outputs of the machine learning model(s).

A data structure may be created and displayed to the user based on the scoring metrics. The data structure may be configured to quantify risks identified for each of the entities and may identify actions configured to mitigate the risks for each entity. In an aspect, quantifying the risks may include accounting for dependency and capability aspects of risk, which are not currently considered by presently available risk analysis techniques. The data structure may be presented to a user via a graphical user interface that enables the user to rapidly view the identified risks and actions to mitigate the identified risks. In some aspects, the graphical user interface may provide interactive elements (e.g., buttons, links, etc.) that enable the user to initiate an action from the displayed data structure. Identifying and quantifying risks using the techniques disclosed herein may enable risks to be identified more accurately (e.g., based on the use of fresh data) and may enable risks to be detected more quickly, thereby allowing actions to mitigate those risks to be implemented sooner, which may minimize the impact that those risks have.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support functionality for identifying, quantifying, and mitigating risks. A dataset that includes a plurality of data items associated with one or more entities is generated and a set of rules is executed against the dataset to determine a sentiment for each data item of the plurality of data items. The dataset may be evaluated against a machine learning model configured to produce a set of risk categorizations that associate each of the plurality of data items with a risk category. Scoring metrics are generated for each of the data items based at least in part on the evaluating. The scoring metrics may account for an impact of dependencies and capabilities of the one or more entities on risks corresponding to the risk categorizations. A data structure may be created and displayed to the user based on the scoring metrics, where the data structure is configured to quantify risks identified for each of the entities and to identify actions configured to mitigate the risks for each entity.

Figure 1:
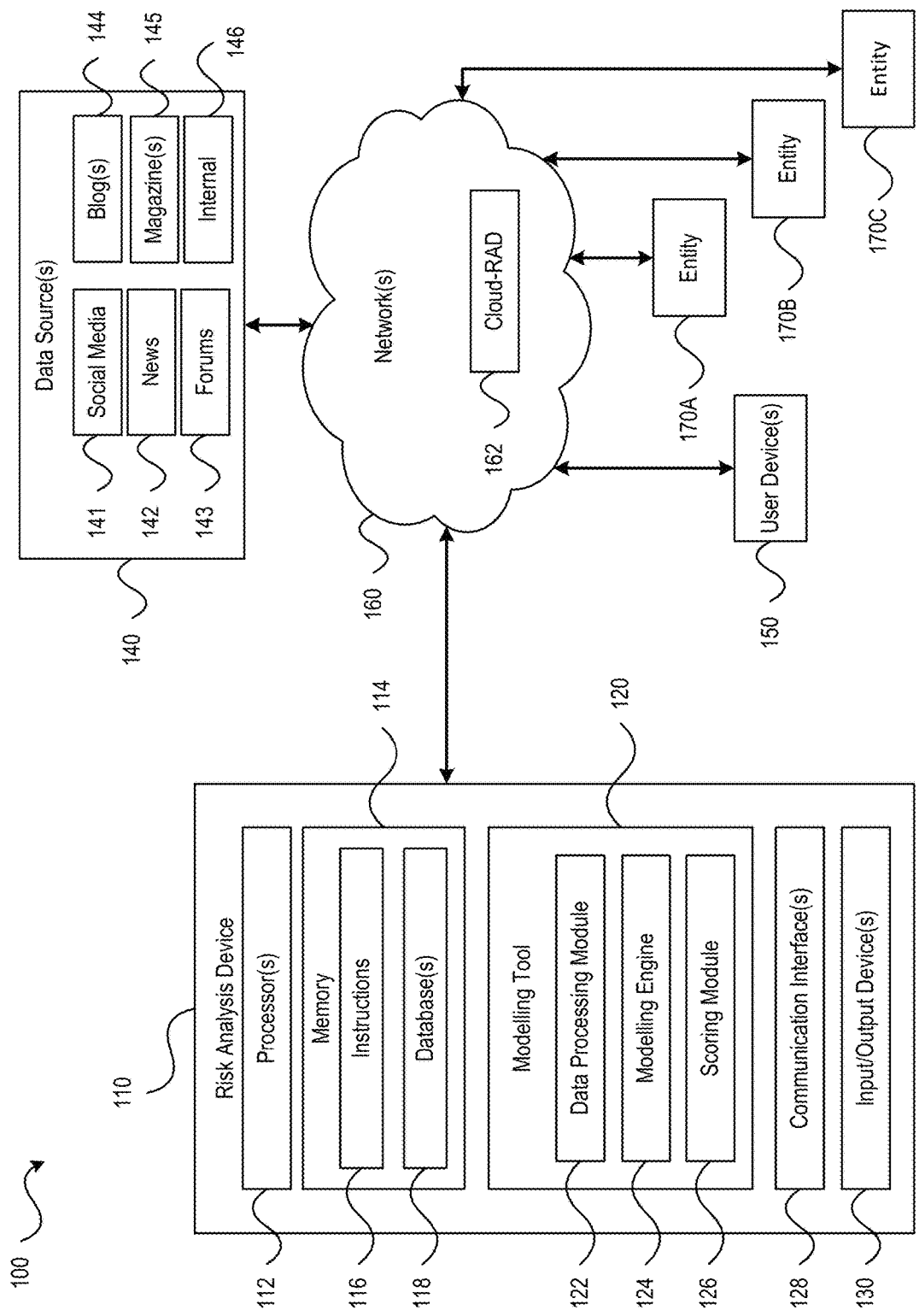
FIG. 1 is a block diagram of an exemplary system for detecting and quantifying third party risk in accordance with aspects of the present disclosure.

As described in more detail below the disclosed risk analysis techniques provide improvements over prior risk analysis techniques. For example, unlike previous techniques which relied on stale data, such as periodic financial statements, the techniques disclosed herein utilize a data retrieval process to retrieve fresh data from one or more data sources. Utilizing fresh data may enable more accurate identification of risks and may enable risk to be identified sooner (e.g., in real-time or near real-time). Another advantage provided by the techniques disclosed herein is the use of sentiment data, which may be used to reduce the dataset, allowing risk analysis to be performed more efficiently (e.g., reduced computing resources, time, etc.) and reducing noise in the data being analyzed, which may improve accuracy of risk identification. Also, by utilizing machine learning techniques to identify or categorize risks, risks may be more accurately identified or detected as compared to the subjective and manual techniques presently used, which are based primarily on financial data. Moreover, the risk analysis techniques disclosed herein enable risk to be quantified while taking into account dependencies and capabilities, which are not accounted for in presently available risk analysis techniques. Referring to FIG. 1, FIG. 1 is a block diagram of an exemplary system for detecting and quantifying third party risk in accordance with aspects of the present disclosure is shown as a system 100. The system 100 may be configured to leverage a variety of machine learning and data processing techniques to analyze a dataset and identify and quantify risks. Additionally, the system 100 enables actions to mitigate risk to be identified and executed. Moreover, because the operations of the system 100 enable risks to be identified more rapidly, the actions to mitigate risk may be executed sooner, which may mitigate and minimize the impact of any identified risks. Further details regarding the functionality of the system 100 are described in more detail below.

The system 100 includes a risk analysis device 110, which may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The risk analysis device 110 includes one or more processors 112, a memory 114, a modelling tool 120, one or more communication interfaces 128, and one or more input/output (I/O) devices 130. In some other implementations, one or more of the components 112-130 may be optional, one or more additional components may be included in the risk analysis device 110, or both. It is noted that functionalities described with reference to the risk analysis device 110 are provided for purposes of illustration, rather than by way of limitation and that the exemplary functionalities described herein may be provided via other types of computing resource deployments or configurations. For example, in some implementations, computing resources and functionality described in connection with the risk analysis device 110 may be provided in a distributed system using multiple servers or other computing devices, or in a cloud-based system using computing resources and functionality provided by a cloud-based environment that is accessible over a network, such as one or more networks 170. To illustrate, one or more operations described herein with reference to the risk analysis device 110 may be performed by one or more servers or a cloud-based system, shown as cloud-risk analysis device 162, that communicates with one or more remote computing devices over the one or more networks 160.

The one or more processors 112 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the risk analysis device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the risk analysis device 110 may be stored in the memory 114 as instructions 116 that, when executed by the one or more processors 112, cause the one or more processors 112 to perform the operations described herein with respect to the risk analysis device 110, as described in more detail below. Additionally, the memory 114 may be configured to store data and information, such as datasets utilized to analyze risk, train machine learning models, or other types of data. The data and information stored at memory 114 may be stored as one or more databases 118. Illustrative aspects of the data and information that may be stored in the one or more databases 118 are described in more detail below.

The one or more communication interfaces 128 may be configured to communicatively couple the risk analysis device 110 to the one or more networks 160 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the risk analysis device 110 includes one or more input/output (I/O) devices 130 that may include one or more display devices, a keyboard, a stylus, one or more touchscreens, a mouse, a trackpad, a microphone, a camera, one or more speakers, haptic feedback devices, or other types of devices that enable a user to receive information from or provide information to the risk analysis device 110. In some implementations, the risk analysis device 110 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the risk analysis device 110.

The modelling tool 120 may include various modules that provide functionality for facilitating risk analysis in accordance with the present disclosure. In the exemplary illustration of FIG. 1, the modelling tool 120 is shown as including a data processing module 122, a modelling engine 124, and a scoring module 126. The data processing module 122 may be configured to aggregate data from one or more data sources 140 accessible via the one or more networks 160. As illustrated in FIG. 1, the one or more data sources 140 may include social media sources 141, news sources 142 (e.g., online news sources, really simple syndication (RSS) feeds, print media news sources, etc.), forums 143 (e.g., websites where users may post information, discuss topics with other users, etc.), blogs 144, magazines 145 (e.g., online or print versions of magazines), internal data sources 146 (e.g., purchase orders, vendor or supplier lists, etc.), or other types of data sources. It is noted that the exemplary data sources 140 shown in FIG. 1 have been provided for purposes of illustration, rather than by way of limitation and that the system 100, and more particularly, the risk analysis device 110, may utilize other types of data sources (e.g., audio data sources such as podcasts, video data sources such as television news broadcasts, etc.) or combinations of different data sources (e.g., a first combination of data sources for risk analysis of a first entity and a second combination of data sources for risk analysis of a different entity). In some aspects, data or information may be obtained automatically from the one or more data sources 140. For example, the data sources 140 may be monitored and new data may be retrieved and stored upon detecting that the new data is available. Additionally or alternatively, information may be retrieved from the one or more data sources 140 periodically, such as once per period of time (e.g., every X hours, X days, X weeks, or some other time interval). Still further, some of the one or more data sources 140 may be configured to push information to the risk analysis device 110. Thus, it should be understood that data processing module 122 may be configured to obtain data from the one or more data sources 140 via a pull (e.g., the data processing module 122 accesses the data sources and downloads or extracts the data) and/or a push (e.g., the data sources transmit or otherwise provide data to the data processing module 122 automatically). Furthermore, the above-described techniques for acquiring data have been provided for purposes of illustration, rather than by way of limitation and that the system 100 may utilize other techniques to acquire data for use by the risk analysis device 110 in accordance with the concepts disclosed herein.

Once the data is aggregated, obtained, or otherwise retrieved from the one or more data sources 140, the data processing module 122 may store the data in the one or more databases 118. In some aspects, the data may be maintained in multiple databases, such as a historic data database and a current data database. The historic data database may include data from the one or more data sources 140 that may be used for purposes of training machine learning models and the current data database may include data obtained from the one or more data sources 140 in connection with a current process to evaluate and/or quantify risk for an entity, as described in more detail below. It is noted that data stored in the current data database may be subsequently transferred to or stored in the historic data database at some point (e.g., after analysis is complete) such that the historic data database may grow over time, thereby providing a robust set of data that may be used to create datasets for training and improving the machine learning models and techniques utilized by the risk analysis device 110 to analyze and quantify risks. It is noted that a single database may be used rather than maintaining multiple databases, and flags or other techniques (e.g., metadata) may be used to designate data as historic data (e.g., data that may be used for training purposes).

In addition to aggregation of data from the one or more data sources 140, the data processing module 122 may be configured to condition or process the data for use by other components or functionality of the modelling tool 120, such as the modelling engine 124. For example the data processing module 122 may be configured to perform lemmatization and stemming (e.g., removing suffixes from words, such as to remove "ing", "ed", or other suffixes from words present in the text included in the dataset(s), and the like), sentence segmentation (e.g., dividing text included in the dataset(s) into component sentences, and the like), noise removal (e.g., remove hypertext markup language (HTML) tags, stop words (e.g., "a", "an", "the", etc.), punctuation marks (e.g., periods, commas, semi-colons, etc.), white spaces, uniform resource locators (URLs), and the like), or other operations to condition the dataset for further use by the modelling tool 120. It is noted that the exemplary conditioning processes described above have been provided for purposes of illustration, rather than by way of limitation and that the data processing module 122 may be configured to perform additional types of conditioning process depending on the types of input data included in the dataset(s). For example, where information provided by a data source includes video or audio content, the data processing module 122 may be configured to perform speech to text operations to extract information from the video or audio content. It is noted that when speech-to-text is utilized, one or more of the above-described conditioning processes may be applied to the resulting text in some implementations. Furthermore, it is noted that one or more of the exemplary conditioning operations described above may be optional and that any combination of conditioning operations or processes may be used by the system 100. For example, during training of a model (described in more detail below) the dataset may be formed using all of the operations described above. A subsequent training may be performed with one or more of the above-operations omitted and the results of the two trainings of the model may be evaluated to see if a particular combination of conditioning processes results in an improved model performance. The combination of conditioning processes providing the best performance may then be used to select a model for use in performing "live" evaluation or analysis of risk for one or more entities (e.g., using the current data database or current data described above).

The data processing module 122 may also be configured to perform other types of operations to process the dataset(s) used by the modelling tool 120. For example, once the conditioning is complete the data processing module 122 may be configured to remove duplicate items of data. For example, a same piece of content may be obtained from different data sources (e.g., different news data sources, social media sources, etc.), such as when a new article is posted to multiple news data sources or when information is posted by multiple users of a social media data source or multiple social media data sources. In some aspects, duplicate data may be identified by comparing the processed data generated by the conditioning processes described above for each piece of acquired data. For example, the comparison may indicate whether two or more pieces of conditioned data are identical (e.g., a 100% or exact match) or not. When they are identical, the two or more pieces of conditioned data may be determined to be duplicates and one copy of the conditioned data may be included in a dataset used for further analysis. In some aspects, duplicate conditioned data items may be identified despite not being an exact match (i.e., identical). To illustrate, a tolerance threshold may be configured such that duplicate pieces of conditioned data may be identified despite the two or more pieces of conditioned data not being identical or not a 100% match, such as when the two or more pieces of conditioned data satisfy a threshold similarity (e.g., 65%, 75%, 80%, 85%, 90%, or some other threshold tolerance). It is noted that the tolerance threshold may be configurable over time to account for improvements in the techniques used to identify duplicate pieces of conditioned data (e.g., as processes to identify duplicate conditioned data improve the tolerance threshold may be increased). In addition to identifying duplicate pieces of conditioned data based on analysis of the contents of the data, the data processing module 122 may also be configured to identify duplicate pieces of data based on other factors, such as whether links from which the data is acquired are identical (e.g., a link to a single online news article may be posted on multiple websites but should only be counted as a single piece of content by the data processing module). Additionally, it is noted that the exemplary techniques described above for detecting duplicate pieces of data have been provided for purposes of illustration, rather than by way of limitation and that other techniques may be utilized to identify and remove duplicate pieces of data from a dataset (e.g., a training dataset or a live analysis dataset) if desired. Upon completing the conditioning processes and removing duplicates, a dataset may be produced by the data processing module 122.

As briefly described above, the dataset(s) produced by the data processing module 122 may be used for training purposes (e.g., to train one or more machine learning models, etc.) or to perform risk analysis for an entity in accordance with the concepts described herein. In particular, once the dataset(s) is generated it may be provided to the modelling engine 124. The modelling engine 124 may be configured to provide functionality for creating, testing, training, tuning, and utilizing various models (e.g., machine learning models) and modelling processes to perform analysis of the dataset in connection with evaluating and quantifying risk(s). In an aspect, the functionality provided by the modelling engine 124 may include determining sentiment of the pieces of data included in the dataset(s), pruning the dataset(s), categorizing risks based on the dataset(s) (or the pruned dataset(s)), or other types of identification of characteristics and metrics using the dataset(s) that may be used to identify and quantify risks.

During sentiment analysis, different pieces of data from the dataset may be analyzed by the modelling engine 124 to identify a sentiment for each piece of data. The sentiment for a particular piece of data of the dataset may indicate whether the particular piece of data indicates a sentiment indicative of a potential risk or lack thereof for the entity under consideration. For example, each piece of data of the dataset (e.g., each article, story, etc. obtained from the one or more data sources 140) may be assigned a score based on the analysis. In some aspects, the score may be a numerical score and different numerical scores may indicate the presence or lack of risk. To illustrate, a score of 1 may indicate positive sentiment, a score of 0 may indicate a neutral sentiment, and a score of −1 may indicate a negative sentiment. In such a scenario, scores of 1 and 0 may indicate that no risk was detected or unclear whether risk is present, while scores of −1 may indicate a potential risk has been detected. It is noted that while the example above contemplates integer scores be applied during sentiment analysis, other scoring techniques may be readily utilized in accordance with the concepts described herein. For example, scores may be calculated within a range between −1 and 1, where fractional scores (e.g., −0.4, −0.2, 0.01, 0.75, etc.) may represent a weighted evaluation of detected sentiment and risk potential.

To facilitate sentiment analysis, the modelling engine 124 may utilize a dictionary or list of keywords, terms, or phrases believed to convey sentiment with respect to risks for an entity. The dictionary of sentiment charged words may be stored at the one or more databases 118. In some aspects the one or more databases 118 may include a plurality of dictionaries and each dictionary may be customized or configured for a particular entity (e.g., business "A", business "B", business "C", etc.), for a particular industry (e.g., manufacturing, energy, housing, finance, etc.), or other types of customized dictionaries. Utilizing customized dictionaries may enable risk analysis to be evaluated more accurately, such as to account for risks particular to a particular entity or industry (e.g., supplier risk for a manufacturer that utilizes various suppliers or vendors to manufacture products), or to avoid or reduce the number of false positive risks identified. For example, risks to one entity may not be risks to another entity (e.g., due to different dependencies between manufacturers and various vendors or capabilities of different vendors used by different manufacturers) and risks in one industry may not be risks to another industry. In some aspects, entries (e.g., keywords, etc.) in the dictionary may be associated values, such as numerical values, indicative of positive or negative sentiment. When a particular entry in the dictionary is observed in the contents of the data undergoing sentiment analysis, the corresponding value may associated with the piece of data being analyzed such that a positive, neutral, or negative sentiment may be determined based on the sum of values corresponding to terms from the dictionary that were identified in the analyzed piece of data.

In some aspects, the sentiment analysis (and dictionary) may account for unigrams (e.g., singular terms) and bigrams (e.g., a combination of two terms). For example, unigrams may include terms such as "lawsuit", "fine", "penalty," "layoffs," "divest," and the like, and bigrams may include combinations of terms, such as "shares fall," "profit declines," "profit declines," and the like. Utilizing dictionaries that include bigrams may enable more nuanced evaluations of sentiment to be performed as compared to using unigrams along. For example, the term "profit" may indicate a positive or negative sentiment depending on the context in which the term is used (e.g., "profit declines" versus "profit rose") and by using bigrams the modelling engine 124 may more effectively evaluate or analyze the contents of the data under analysis and the contents in which certain terms are presented within the contents. Furthermore, it is noted that the modelling engine 124 and/or the dictionaries may be configured to consider or include combinations of terms other than bigrams, such as trigrams (e.g., "earnings beat expectations"). While unigrams, bigrams, or other types of keywords and combinations of keywords may be utilized to identify portions of the contents of pieces of data in the dataset under consideration that may convey sentiment, it should be understood that not every word or phrase within a particular piece of data of the dataset may carry sentiment. Such words may be assigned a sentiment score of 0 (e.g., a score representing neutral sentiment, or neither positive nor negative sentiment).

The modelling engine 124 may utilize the sentiment scores to classify sentiment for each piece of data included in the dataset based on the sentiment score assigned to each piece of data using the sentiment analysis described above. To illustrate, pieces of information from the dataset may be classified as carrying positive sentiment when the sentiment score is greater than 0 (e.g., sentiment score >0), negative sentiment when the sentiment score is less than 0 (e.g., sentiment score <0), or neutral sentiment when the sentiment score is 0 (e.g., sentiment score=0). The sentiment classification may indicate that a particular piece of data from the dataset has a positive sentiment, a neutral sentiment, or a negative sentiment. Additional aspects of performing sentiment classification are described in more detail below.

As briefly described above, the dataset(s) under consideration by the modelling engine 124 may be reduced or pruned prior to further use of the dataset to identify and/or quantify risk. In some aspects, the pruning may include removing pieces data from the dataset. The removed pieces of data may include pieces of data classified as carrying positive sentiment, neutral sentiment, or both from the dataset. It is noted that rather than removing the pieces of data from the dataset, the pruning may be accomplished via setting of flags associated with the sentiment of the corresponding piece of data. For example, a flag associated with a piece of data carrying negative sentiment may be configured to a first value by the pruning process and the flag may be configured to a second value by the pruning process when the piece of data carries positive sentiment or neutral sentiment. In some aspects, different flag values may be configured for positive and neutral sentiment (e.g., 3 different flag values), rather than a binary flag configuration (e.g., one flag value for negative sentiment and a different value for positive and negative sentiment). It is noted that while the non-limiting examples above involve removing pieces of data from the dataset or configuring flags based on the sentiment, such pruning techniques have been described for purposes of illustration, rather than by way of limitation and that other techniques may be utilized by a modelling engine to reduce the dataset if desired. Regardless of the particular techniques utilized to prune the dataset, removing the pieces of data from the dataset may improve the accuracy of risk identification processes. For example, removing pieces of data classified as carrying positive sentiment may remove certain biases that may create noise when identifying potential risks, which may be indicated or more likely to be indicated in pieces of data carrying negative sentiment. Furthermore, removing pieces of data carrying neutral sentiment may enable subsequent processes to be performed more efficiently (e.g., faster, require fewer computational resources, etc.) and may reduce additional noise from the dataset, which may enable more accurate risk identification and/or quantification.

Once the dataset is reduced, the modelling engine 124 may execute one or more machine learning models against the (pruned) dataset. The machine learning models may be configured to classify or categorize pieces of data from the dataset into risk categories. For example, the risk categories may include a compliance risk category, a financial risk category, an operational risk category, a reputational risk category, a strategy risk category, or other types of risk categories. The compliance risk category may be associated with risks related to one or more regulatory compliance requirements, internal governance requirements, or other types of compliance issues. The financial risk category may be associated with risks related to financial losses, loan defaults, loss of sales, drops in price of one or more products, or other types of risks involving financial aspects that may impact an entity. The operational risk category may be associated with risks related to loss of workers, closing of one or more locations of an entity (e.g., a manufacturing plant, etc.), supply chain delays, product or components supply shortages, and the like. The reputational risk category may be associated with risks related to damage to a brand (e.g., negative perception of the quality of a newly released product, an entity is unable to meet its financial obligations, etc.) or other types or reputational risk, and the strategy risk category may be associated with aspects of an entity's strategic approach (e.g., competition pressure, marketing, etc.) or other strategy objectives and factors.

As briefly described above, the modelling engine 124 may utilize one or more machine learning models to analyze datasets. The modelling engine 124 may provide various functionalities to support the utilization of the one or more machine learning models in connection with analyzing the datasets, such as processing at least a portion of the datasets for use with the one or more machine learning models (e.g., count vectorization, etc.), training and testing of the one or more machine learning models using information stored in the one or more databases 118 (e.g., historic data), selecting one or more models (e.g., for use in analyzing supplier risk based on live datasets), model finalization and tuning, and other operations. Additional details regarding these functionalities are described in more detail below. Once the models are finalized and tuned, the modelling engine 124 may utilize the (tuned) models to analyze risk of live datasets (e.g., datasets formed from fresh or recently acquired data obtained from the one or more data sources 140). During analysis, the one or more machine learning models may be configured to categorize or classify risks, as described above.

The categorized risk data output by the one or more machine learning models may be provided to the scoring module 126, where it is utilized to perform risk scoring. The risk scoring may be performed on a per-data-item basis, such that each piece of data in the dataset is evaluated and taken into account in the scoring. For example, the categorized risk data may include classifications of risk for each data item and the scoring module 126 may be configured to assess the intensity of the data items and evaluate the frequency of different types of risk for each risk category. The scoring module 126 may then determine a risk score for an entity under evaluation based on the intensity and frequency information derived by the scoring module 126. In some aspects, the scoring module 126 may further categorize the risk score. For example, risk scores may be categorized into different levels of risk (e.g., high, medium, low, or some other risk level system or scheme). In some aspects, the risk scores may also take into account the sentiment.

In some aspects, the risk scoring module 126 may also evaluate one or more additional risk factors. For example, the risk scoring module 126 may also calculate or determine a dependency score and/or a capability score. The dependency score may evaluate aspects of a relationship between two or more different entities, different portions of a single entity (e.g., different divisions or groups within a single entity), or other types of factors related to the entity being evaluated and dependencies of the entity's operations. Exemplary types of data that may be evaluated during dependency scoring may include purchase order data (e.g., what is the spend of the entity with a particular supplier or the spend on a particular product across multiple suppliers), supplier engagement, availability of alternative vendors or suppliers, a type of the supplier or vendor, and the like. Taking into account the dependency data may enable the system 100 to assess whether alternative suppliers are available, which may be used to assess dependency related risks (e.g., if no alternative sources or suppliers are available risk may be higher than if one or more alternative sources or suppliers are available). The capability score may evaluate aspects of an entity's capabilities, taking into account factors such as a size of the entity, capabilities of the entity (e.g., ability to increase production, hire additional workers, repurpose products or materials, etc.), a type of the entity, and the like. Taking capability factors into account may enable the system 100 to assess risks that may not be accounted for by dependency related factors. For example, a supplier having a high capability may be able to source additional quantities of a product, material, component, and the like to a manufacturer regardless of the availability of alternative sources for the product, material, component, etc. Moreover, capability factors may also enable the impact of dependencies to be more effectively accounted for. To illustrate, a supplier having low capabilities may pose a higher risk when dependency is high, but where dependency is low, the low capabilities of a supplier may present less of a risk since alternative suppliers or sources are readily available in the event the capabilities of the supplier are insufficient to meet the manufacturer's needs for sourcing products, materials, components, and the like.

The risk score(s) may be utilized to quantify the identified risks. In an aspect, the quantification of identified risks may include creating a data structure associated with the various types of risks that have been scored. For example, the data structure may be a risk, capability, and dependency (RCD) cube, described and illustrated in more detail below with reference to FIG. 4. The data structure may be presented to a user via a user device, such as user device 150 (e.g., a desktop computing device, a laptop computing device, a tablet computing device, a smartphone, etc.), and the user may utilize the information presented in the data structure to evaluate the risks. In some aspects, the data structure may also include information associated with recommended courses of action, which may be determined based on the categorization of the identified risks (e.g., based on whether the identified risks are categorized as high risk, medium risk, or low risk). For example, where a low risk is identified, no further action may be needed or recommended, but where a high risk is identified, one or more actions to address the risk may be included in the data structure. In some aspects, the actions may be determined by a user based on the data structure, rather than being included in information of the data structure itself.

During operation, risk analysis device 110 (or cloud-based risk analysis device 162) may be accessed by a user to evaluate, analyze, and quantify risk associated with one or more entities, such as one of the entities 170A, 170B, 170C, using the techniques described above. As a non-limiting example, suppose that a user of the user device 150 wanted to evaluate or quantify risk associated with the entity 170A. To evaluate entity 170A, the user may access the risk analysis device 110 and utilize the functionality of the modelling tool 120 to perform processing as described above. For example, the user may utilize the functionality of the data processing module 122 to compile a dataset that includes different pieces of information related to the entity 170A obtained from one or more of the data sources 140. As described above, the pieces of information included in the dataset may be subjected to various data preparation and conditioning processes (e.g., lemmatization, stemming, de-duplication, etc.). Once those processes are completed, the outputs of the data processing module 122 may be provided to the modelling engine 124, where one or more machine learning models or other processes may be utilized to evaluate a sentiment of the pieces of information in the dataset, dataset reduction (e.g., remove duplicate pieces of information from the dataset, remove pieces of information carrying positive sentiment, neutral sentiment, or both, or other dataset reduction techniques), risk classification, or other processes. Outputs of the modelling engine 124 may be provided to the risk scoring module 124, which may utilize the sentiment classifications, the risk classifications, and other techniques described above to quantify risks, which may be incorporated into a data structure, such as the above-described RCD cube. The data structure may be presented to the user via a graphical user interface to allow the user to review the identified risks.

As described above, the data structure may also include recommended actions to address the identified risks. For example, the user may be associated with a manufacturer and entity 170A may be a supplier or vendor that provides components or materials to the manufacturer. The risks indicated in the data structure presented to the user may identify risks associated with the risks, capabilities, and dependencies associated with the entity 170A from the manufacturer's perspective. Dependencies indicated in the data structure presented to the user may be based on various factors, such as share of spend that the manufacturer has with the entity 170A (e.g., a volume or amount of money spent by the manufacturer with the entity 170A), scope of engagement between the manufacturer and the entity 170A (e.g., a number of purchase orders between the manufacturer and the entity 170A, factors related to contracts between the manufacturer and the entity 170A, etc.), availability of other entities serving the same role of the entity 170A (e.g., whether there are other entities that can supply the products, components, etc. supplied to the manufacturer by the entity 170A), a type associated with then entity 170A, or other factors. Exemplary capability risks that may be indicated in the data structure may include information related to a size of the entity 170A, capabilities of the entity 170A (e.g., ability to increase production, guarantee delivery, etc.). As described above, the dependency and capabilities information may include a score, one or more categories, and the like, which may be utilized to control presentation of the dependency and capability information within the data structure.

As briefly described above, one or more actions or recommendations may be presented in connection with the risks and other information included in the data structure. The actions or recommendations may include different types of actions, such as investigative actions, contractual actions, and strategic actions that may be taken to mitigate the risks associated with the entity 170A and the impact that the identified risks may have on the manufacturer. Exemplary and non-limiting examples of recommendations and/or actions that may be taken based on risks, capabilities, and dependencies are shown in the table below:

TABLE 1

When the supplier risk is high and capability is low,

If client dependency on supplier is low, it is better to terminate the contract with supplier and switch to another supplier. If dependency is high like in case of niche product/monopoly market, client needs to remove the dependency by planning long-term of substituting the product with alternatives. If the dependency is medium, the client can retain the current supplier for time being and engage a new supplier in JV for long-term When the supplier risk is high and capability is medium, If client dependency on supplier is low, client can diversify the risk with supplier by engaging other suppliers as well. If dependency is high, client can plan for emergencies by including insurance and contingency clauses in contract. If the dependency is medium, the client can explore alternate sourcing options from the same supplier such as primary & secondary sourcing locations in case of emergencies.

When the supplier risk is high and capability is high,

If client dependency on supplier is low, client can enforce penalty/liability clauses in the contract to protect his interest in case of risk occurrence. If dependency is high, client can keep tracking the situation through internal/third-party intelligence and prediction of supplier performance and risk. If the dependency is medium, the client can conduct periodic or surprise internal/third-party audits of supplier and escalate, if necessary.

When the supplier risk is Low and capability is low,

If client dependency on supplier is low, client can diversify the spend with supplier by engaging other capable suppliers as well. If dependency is high, client has no other option than training the suppliers to improve their capability and performance. If the dependency is medium, the client can use KPIs apart from SLAs and conduct periodic evaluation to stimulate better performance from the supplier When the supplier risk is Low and capability is Medium, If client dependency on supplier is low, client doesn't have to take any action immediately, as there is no risk expected from supplier and even if there is client has more options to source. If dependency is high, client can continuously monitor the supplier as a precautionary step. If the dependency is medium, the client can enter short-term contracts with suppliers to confirm supply till they find alternative in case of need.

When the supplier risk is Low and capability is High,

If client dependency on supplier is low, client should consider increasing the business with supplier given the best-case scenario. If dependency is high, client can enter long-term contracts with supplier to confirm uninterrupted supply. If the dependency is medium, the client can consider this supplier as best alternate supplier for substituting any other supplier When the supplier risk is Medium and capability is Low, If client dependency on supplier is low, client can terminate the purchase from supplier without terminating the complete Contract/Master Service Agreement (MSA) and consider purchasing from other highly capable supplier. If dependency is high, client can guide the supplier through TABLE 1-continued 'directed buy' that specifies the components and pre-approved tier II suppliers from whom the components can be sourced to ensure quality. If the dependency is medium, the client can diversify the spend/risk with supplier by engaging other capable suppliers.
When the supplier risk is Medium and capability is Medium, If client dependency on supplier is low, client can enforce penalty/liability clauses in the contract to protect his interest in case of risk occurrence. If dependency is high, client can take performance bond guaranteeing the performance or reimbursement. If the dependency is medium, the client can use KPIs apart from SLAs and conduct periodic evaluation, to stimulate better performance from the supplier
When the supplier risk is Medium and capability is High, If client dependency on supplier is low, client can conduct periodic or surprise internal/third-party audits of supplier and escalate, if necessary. If dependency is high, client can continuously monitor the supplier as a precautionary step. If the dependency is medium, the client can keep tracking the situation through internal/third-party intelligence and prediction of supplier performance and risk.

It is noted that the exemplary actions and recommendations shown above in Table 1 above have been provided for purposes of illustration, rather than by way of limitation and that the actions and recommendations output by the risk analysis device 110. Additionally, as shown above, the actions may be determined based on different types of risks determined by the modelling engine 124 and the score(s) determined by the scoring module 126. Furthermore, unlike existing techniques for evaluating risk, which rely on subjective judgments and stale data, the actions and recommendations to mitigate risk provided by the system 100 may take into account different capabilities and dependencies of the entity or entities involved in the analysis (e.g., the manufacturer and the entity 170A in the example above).

The user may view the data structure via a graphical user interface provided by the modelling tool 120. For example, the graphical user interface may present various interactive elements (e.g., buttons, dropdown menus, checkboxes, wizards, etc.) that enable the user to initiate analysis of risks associated with an entity. To illustrate, the user may provide inputs to one or more data fields of the graphical user interface associated with one or more entities to for analysis and then select or activate one of the interactive elements to start the analysis. In response to activation of the interactive element (e.g., a start analysis button, etc.) the data processing module 122 may access the data sources 140 to obtain pieces of information related to the one or more entities designated by the user. Once the data is obtained, it may be processed and used to form a dataset that may be evaluated by the modelling engine 124 and the scoring module 126, as described above, and risk information (e.g., the above-described data structure and other information) may be presented to the user. In some aspects, the graphical user interface may enable the user to view and initiate one or more of the actions or recommendations associated with the identified risks.

Initiating the one or more actions may include transmitting one or more messages to other users (e.g., users with authority to approve the actions, carry out the actions, etc.), transmitting one or more messages to third parties (e.g., ordering quantities of a product from an alternative supplier when risk of and/or dependence on a current supplier is high, capability of the current supplier is low, and the like), or other types of actions. For example, suppose that the actions indicated that an alternative supplier for components provided or supplied by the entity 170A should be sought based on the identified risks, capabilities, and dependencies represented in the data structure. The graphical user interface provided by the risk analysis device 110 may provide functionality for determining whether another supplier for the components exists, such as one of the entities 170B, 170C. If another supplier exists, the graphical user interface may provide functionality for initiating one or more orders for the components from the newly identified or selected supplier. In some aspects, the one or more orders may be initiated from the graphical user interface via an application programming interface (API) to a purchasing system of the manufacturer. In additional or alternative aspects the order may be created directly from the graphical user interface without interfacing to another system or software. It is noted that the exemplary actions described above are provided for purposes of illustration, rather than by way of limitation and that the graphical user interface may provide functionality for initiating additional types of functionality and actions, as well as other capabilities depending on the particular configuration of the system 100.

As shown above, the system 100 may enable third party risks to be evaluated in a manner that improves over existing systems by taking into account dependencies and capabilities, both of which are factors that are not presently capable of being considered by currently available techniques. Additionally, the risk analysis techniques provided by the system 100 utilize fresh data retrieved from a variety of different data sources, such as the data sources 140 described above, thereby enabling monitoring of risk in a manner that reflects current or real-time risks to be identified and quantified. It is noted that real-time in this context indicates that as new information becomes available to the system 100 (e.g., when news articles are published, blog posts are posted, etc.) rather than implying that the system 100 continuously monitors and identifies risks on a per-minute or per-second basis. Regardless, the real-time nature or freshness of the data utilized by the system 100, and more particular the risk analysis device 110 and its machine learning models and techniques, may represent a more accurate and current view of third party risk, including identification of dependencies and capabilities, as compared to using stale data relied on by existing techniques, such as financial data that may be prepared once per month, quarter, and so on. Thus, the freshness of the data utilized by the system 100 enables more accurate identification of risks to be achieved as compared to existing third-party risk identification techniques.

Figure 2:
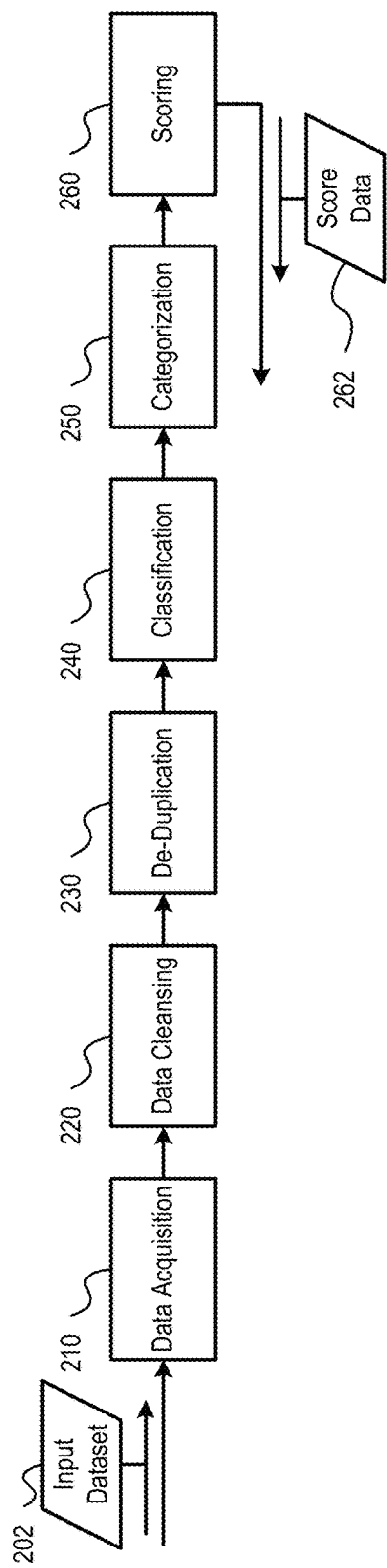
FIG. 2 is a block diagram illustrating exemplary operations for detecting and quantifying third party risk in accordance with aspects of the present disclosure.

Referring to FIG. 2, a block diagram illustrating exemplary operations for detecting and quantifying third party risk in accordance with aspects of the present disclosure is shown. In particular, FIG. 2 shows a processing flow of some of the above-described processes performed by the modelling tool 120 of FIG. 1 to detect, identify, and quantify risk. As described above, the data processing module 122 of the modelling tool 120 may compile an input dataset 202 during a data acquisition phase 210. The input dataset 202 compiled during the data acquisition phase 210 may include data retrieved from one or more data sources (e.g., the data sources 140 of FIG. 1). It is noted that data acquisition phase 210 may be performed on demand, automatically, or both. To illustrate, on demand data acquisition processes may be initiated at the request of a user (e.g., a user of the user device 150 of FIG. 1). In such a scenario, the request may indicate a time period for the data acquisition process such that data within the time period (e.g., one or more days, weeks, months, etc.) be acquired from the one or more data sources. The request may also specify data sources from which the dataset 202 should be acquired. In some aspects, the specified data sources may include all available data sources or may exclude some data sources from being used during the data acquisition process. The request may also identify one or more entities associated with the data acquisition process, such as one or more of the entities 170A-170C of FIG. 1. Other data acquisition parameters may also be configured in the request. For example, in addition to acquiring data from the one or more data sources, the data acquisition process may also obtain local data. The local data may correspond to data generated by the entity initiating the data acquisition process, such as purchase order data for a manufacturer, which may be utilized by subsequent risk analysis processes (e.g., to evaluate dependencies, etc.).

When the data acquisition process is initiated automatically, the data may be obtained from the one or more data sources at pre-determined time intervals, such as once per hour, every 12 hours, once per day, week, or some other time interval. The time interval utilized by the data acquisition process may be configurable. In some aspects, the configuration of the time interval may be on a per-data source basis such that data is obtained from different data sources at different time intervals. For example, a news data source may publish data more frequently than a blog data source and so the time interval for news data sources may be configured to provide for more frequent retrieval of data from the news data source than the time interval used for blog data source (e.g., data may be retrieved from news data sources once per hour while data may be retrieved from blog data sources once per day or once per week). Regardless of whether the number time intervals is utilized, data acquired during automatically initiated data acquisition processes may be stored in a database (e.g., the one or more databases 118 of FIG. 1) for subsequent use in performing risk analysis and quantification. In some aspects, automatic data collection may be limited to data associated with one or more designated entities. For example, the automatic data acquisition process may be configured to retrieve data from the one or more data sources for one or more specified entities (e.g., a list of suppliers or companies that a business has relationships with), which may minimize the amount of memory required to store data retrieved from the one or more data sources. Additionally or alternatively, data may be deleted after a period of time (e.g., 3 months, 6 months, 12 months, etc.) to reduce the amount of memory required to store retrieved data. In some aspects, rather than deleting data it may be moved to or classified as historical data and may be used for training the machine learning models, as described in more detail below with reference to FIG. 3.

Once the input dataset 202 is acquired at the data acquisition step 210 (e.g., by the data processing module 122 of FIG. 1), it may be subjected to various data processing and conditioning steps at data cleansing process 220. As described above with reference to FIG. 1, the data cleansing process may include various operations to condition the data for use by the machine learning models and techniques of the modelling tool 120, such as lemmatization, stemming, and the like. The outputs of the data cleansing step 220 may be further processed at de-duplication block 230, where duplicate entries or pieces of data may be removed. For example, where the input dataset 202 is formed using social media data from a social media source may include multiple pieces of the same data, such as when multiple users post and/or repost the same information. During the deduplication process any duplicate entries may be reduced to a single entry. In the example of social media data, an original post may be retained within the input dataset 202 while reposts of the original post may be removed. In some aspects, the number of pieces of duplicate data included in the dataset may be used to weight the pieces of data. For example, social media posts having more reposts may be considered to carry more weight than posts that have fewer reposts. It is noted that while FIG. 2 illustrates the deduplication phase as occurring after the data cleansing phase 220, in some aspects the deduplication phase 230 may occur prior to the data cleansing phase 220, which may reduce the amount of computing resources and time required to perform the data cleaning operations (e.g., because the input dataset may be reduced due to the deduplication of the dataset).

Following the data acquisition phase 210, the data cleansing phase 220, and the deduplication phase 230, the input dataset 202 may be provided to a modelling engine (e.g., the modelling engine 124 of FIG. 1). As described above with reference to FIG. 1, the modelling engine may perform various types of operations to analyze and evaluate the input data in connection with identifying and quantifying risks. For example, the modelling engine may perform a classification phase 240. During the classification phase 240 sentiment analysis may be utilized to evaluate and classify each piece of data in the input dataset 202 as carrying positive, negative, or neutral sentiment with respect to one or more types of risk. The classification of sentiment for the pieces of data from the input dataset 202 may utilize a dictionary of keywords, terms, and/or phrases (e.g., unigrams, bigrams, and the like). The different entries in the dictionary may each be associated with positive sentiment (e.g., terms that when present indicate positive sentiment) or negative sentiment (e.g., terms that when present indicate negative sentiment). The dictionary may not include information related to neutral sentiment—instead, pieces of data may be classified as carrying neutral sentiment when no positive or negative sentiment indicative terms are identified.

While the deduplication phase 230 may reduce the size of the input dataset 202, additional techniques may be utilized to reduce the size of the input dataset 202 as it is processed by the modelling tool. For example, the sentiment classification may be utilized to eliminate pieces of data from further consideration, such as pieces of data carrying positive and neutral sentiment. These pieces of data (e.g., positive and neutral sentiment data) may be removed from or flagged (e.g., identified for exclusion from analysis) the input dataset 202 on the basis that risks may be more likely to be identified in pieces of data carrying negative sentiment and therefore those pieces of data (e.g., negative sentiment data) may be more relevant for risk identification and quantification analysis. As above, reducing the size of the input dataset through de-duplication and/or sentiment-based reduction techniques reduces the size of the input dataset 202, which may enable the input dataset 202 to be analyzed more rapidly via the machine learning techniques and other processes described herein.

After the deduplication phase 230 and the classification phase 240, a categorization phase 250 may be performed. During the categorization phase 250 the input dataset 202 (or reduced input dataset) may be analyzed using various machine learning techniques to categorize risks associated with each piece of data in the input dataset. For example, each piece of data may be categorized into one or more risk categories, such as compliance risk, financial risk, operational risk, reputational risk, strategy risk, or other types of risk categories. These different categories may be utilized to evaluate dependency and capability relationships during the subsequent scoring phase 260. For example, a piece of data that is categorized as relating to operational risk (e.g., loss of workforce or labor, etc.) may impact a capability score since the operational risk may signal that capabilities (e.g., production capabilities, etc.) may be reduced, at least temporarily, for the entity under consideration.

During the scoring phase 260, scoring metrics may be assigned to each piece of data and aggregated scores may be utilized to evaluate an overall risk score for each entity being analyzed. During the scoring an intensity of each piece of data (e.g., the data acquired from the one or more data sources 140 of FIG. 1) may be evaluated. Additionally, a frequency metric may be determined for each category of data. As an illustrative example, Table 2 below shows 47 different categories of data and intensity levels assigned to each category:

TABLE 2

| Risk Category | Categorization | Intensity Level |
|---|---|---|
| Compliance Risk | Labor Law Issues | 4 |
| Compliance Risk | IP Infringement | 4 |
| Compliance Risk | HSE Risk | 3 |
| Compliance Risk | Payment Default | 2 |
| Compliance Risk | Debarred Contracts | 3 |
| Compliance Risk | Lawsuit | 4 |
| Financial Risk | Bankruptcy | 5 |
| Financial Risk | Cost Pressure | 2 |
| Financial Risk | Decline in Earnings/Sales | 3 |
| Financial Risk | Decline in stock | 2 |
| Financial Risk | Low assets utilization | 2 |
| Financial Risk | Pricing pressure | 2 |
| Financial Risk | Investment issues | 3 |
| Financial Risk | Debt Issues | 3 |
| Financial Risk | Loss of Contract | 3 |
| Financial Risk | Layoff | 4 |
| Financial Risk | Divestment | 2 |
| Operational Risk | Accident | 4 |
| Operational Risk | Shutdown | 5 |
| Operational Risk | System Failure | 3 |
| Operational Risk | Labor issues | 4 |
| Operational Risk | Natural Disaster | 5 |
| Operational Risk | Incident/Unrest | 4 |
| Reputational Risk | Data Security | 3 |
| Reputational Risk | Corruption | 4 |
| Reputational Risk | Downgraded Forecast | 1 |
| Reputational Risk | Allegations | 1 |
| Reputational Risk | Legal issues | 3 |
| Reputational Risk | Product quality | 2 |
| Reputational Risk | Contract termination | 3 |
| Reputational Risk | Management change | 1 |
| Reputational Risk | Environmental Issues | 3 |
| Reputational Risk | Downgraded Rating | 2 |
| Reputational Risk | Fine | 3 |
| Reputational Risk | Investigation | 1 |
| Reputational Risk | Public Protests | 2 |
| Reputational Risk | Trade issues | 2 |
| Reputational Risk | Warning | 2 |
| Reputational Risk | Criticism | 1 |
| Reputational Risk | Ban or boycott | 3 |
| Strategy risk | Competition Pressure | 2 |
| Strategy risk | Marketing Failure Risk | 2 |
| Strategy risk | Organizational Change Risk | 1 |
| Strategy risk | Product Risk | 3 |
| Strategy risk | Regulatory Change | 2 |
| Strategy risk | Exchange Rate risk | 2 |
| Strategy risk | Infrastructure risk | 2 |

As shown in Table 2 above, each category from the categorization phase 250 may map to one or more risk categorizations and each category/risk categorization pair may map to an intensity level. During the scoring phase 260, the category and risk categorization information for each piece of data may be utilized to calculate an intensity score using a mapping similar to that of Table 2 above. Once the intensity of the input dataset 202 is determined, a frequency at which different categories and risk categorizations (and corresponding intensities) appear within the dataset may be determined. Using the intensity level and frequency of appearance, a risk score may be determined. For example, in an aspect, the risk score may be calculated by multiplying the intensity for each category (e.g., column 3 above) by the frequency at which pieces of data matching the intensity level are found within the dataset. Once the risk scores across all categories are calculated, the risk scores may be aggregated to produce a final score. It is noted that the scoring process described above may be performed on a per-entity basis if multiple entities are being analyzed. Once the risk score is calculated, the risk score may be quantified as a particular level of risk, such as high, medium, low, or another type of risk quantification.

A set of score data 262 may be produced based on the risk scores calculated during the scoring phase 260. As described above, the risk scores may be utilized to quantify risk. In some aspects, the quantification of risk may also be based on dependency and capability information. Dependency characteristics may be evaluated based on a variety of metrics. To illustrate, in a manufacturing context dependency may be based on an amount of money spent with a particular entity under consideration, a frequency at which purchases are made from the entity, availability of alternate vendors from which purchases may be made, and a type of the entity, such as whether the entity is unique (e.g., manufactures a specialty part or component that is not widely available) or common (e.g., manufactures or supplies a part or component that is widely available). As can be appreciated from the foregoing, where the entity is unique or the availability of alternate vendors is low, the dependency metrics may indicate a higher level of dependency. Additionally, where the amount of money spent with the entity is low or the frequency at which purchases from the entity are made is low, dependency may also be low and vice versa.

In some aspects, the dependency metrics may be calculated based on weighting information. For example, different dependency characteristics may be weighted differently to reflect an impact that each characteristic has on the level of dependency for the entity under consideration. For example, a unique vendor may have a higher weight compared to a preferred or optional entity and a preferred entity may have a higher weight compared to an optional entity. In an aspect, a dependency score may be determined based on the weights and their associated dependency characteristics (e.g., spend, purchase frequency, alternative vendor availability, vendor type, and the like). For example, the dependency score(s) may be determined by multiplying the scores associated with each dependency characteristic with the assigned weights. Alternatively (e.g., when weighting is not used), the dependency score may be calculated based on the sum of the scores associated with each dependency characteristic. As with the risk scores, the dependency scores may be associated with a dependency category (e.g., high dependency, medium dependency, low dependency, and the like).

Similar to dependency, capabilities may also be scored. To illustrate, capabilities may be scored based on various capability characteristics for the entity under evaluation. Exemplary capability characteristics may include entity size (e.g., revenue, number of employees, capacity, etc.), capability (e.g., product availability, payment terms compliance, industry experience, certifications, and the like), and entity type (e.g., integrated or not-integrated (e.g., with a system of the entity conducting the analysis), a trader versus a manufacturer, regional or global entity, supplier diversity, estimates of competition in the market, and the like). Each characteristic and potential value or range of values may be associated with a score that may be summed to calculate the capability score. To illustrate, the entity size characteristic may include various parameters (e.g., revenue, employees, capacity, etc.) and different values of these parameters may be associated with different capability scores. Similarly, the capability characteristic may include various parameters (e.g., product availability, compliance, industry experience, certifications, etc.) and each parameter may be associated with a different score. The entity type characteristic may be scored in a similar manner with different scores being associated with parameters related to integration/non-integration of the entity, whether the entity is regional or global, market competition, etc. In some aspects, weights may also be applied and may function in a manner similar to that described above for dependency scoring using weights (e.g., weights applied to different characteristics or parameters may be utilized and may take into account optional, mandatory, and preferred features, with optional features having less weight than preferred features and preferred features having less weight than mandatory features). As with the risk and dependency scores, the capability scores may be categorized into a set of capability categorizations (e.g., high capability, medium capability, low capability, etc.).

As described briefly above with reference to FIG. 1 and in more detail below with reference to FIG. 4, the score(s) (e.g., the risk score, dependency score, and capability score) for each entity may be utilized to generate a data structure that quantifies risks for an entity. Unlike existing techniques, the data structure may quantify risks in a manner that accounts for dependencies and capabilities of the entity or entities being analyzed, which may provide more meaning insights into the scope of the risks. In quantifying the risks for the entity, the data structure may indicate one or more actions to mitigate at least a portion of the identified risks (e.g., mitigate dependency risks, capability risks, etc.). Using the above described processing flow, risks may be rapidly and automatically identified using a fresh dataset compiled from a plurality of different types of data sources, thereby enabling risks to be quantified and identified more rapidly and more frequently as compared to prior techniques, which relied on data that was typically only publicly available once per month, quarter, etc. Additionally, the automated techniques may enable monitoring processes to be set up to monitor for risks associated with one or more designated entities. During the monitoring, alerts may be generated and presented to users when new risks are identified or when an overall risk categorization for one of the monitored entities changes. An exemplary user interface for displaying risk-based alerts to users is described in more detail below.

Figure 3:
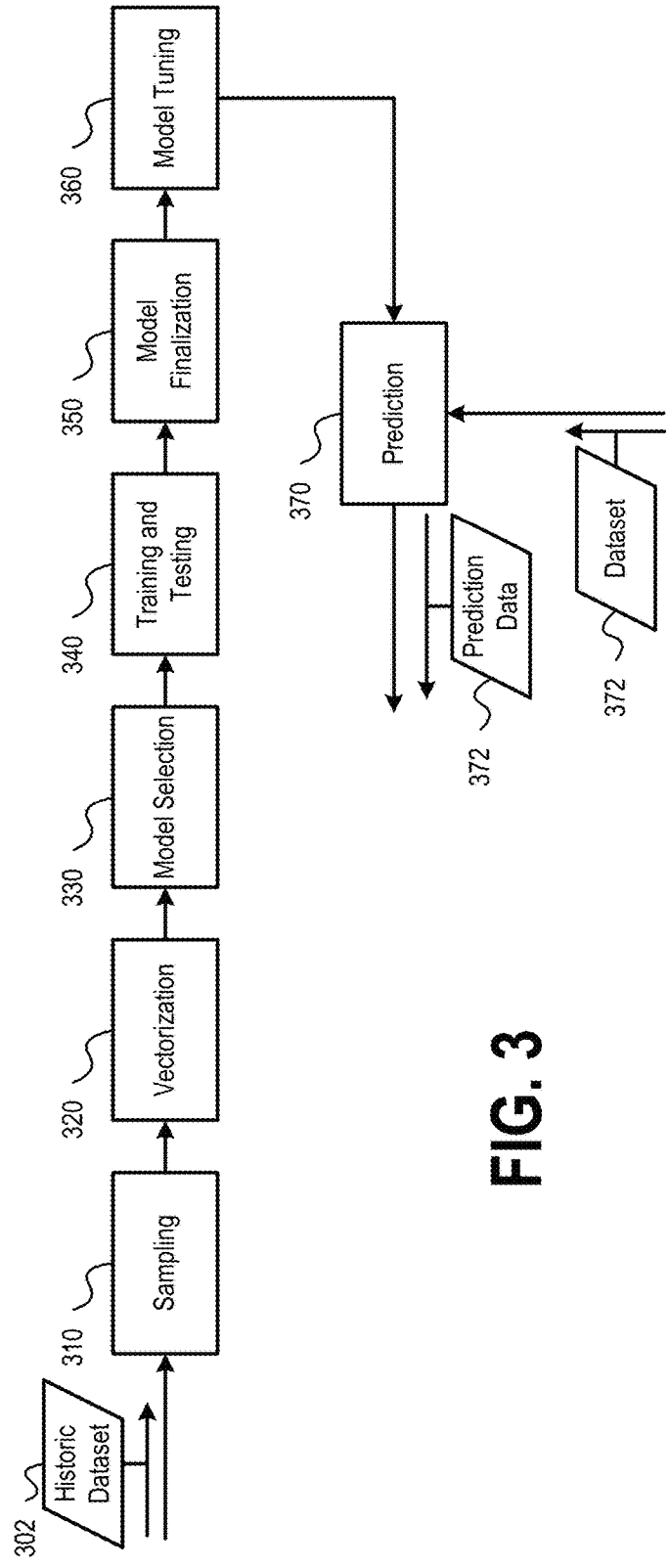
FIG. 3 is another block diagram illustrating exemplary operations for detecting and quantifying third party risk in accordance with aspects of the present disclosure.

Referring to FIG. 3, another block diagram illustrating exemplary operations for detecting and quantifying third party risk in accordance with aspects of the present disclosure is shown. In particular, FIG. 3 shows a processing flow for some of the above-described processes performed by the modelling tool 120 of FIG. 1 to detect, identify, and quantify risk. As described above, the modelling tool 120 may compile datasets (e.g., during the data acquisition phase 210 of FIG. 2). The compiled datasets may include data retrieved from one or more data sources (e.g., the data sources 140 of FIG. 1) and may include historic data, which may be stored at a database (e.g., the one or more databases 118 of FIG. 1). It is noted that the historic data may evolve over time. For example, as models are used to evaluate risks for one or more entities, as described above with reference to FIGS. 1 and 2, the datasets upon which that analysis is performed may be incorporated into the historic data for subsequent use in training, validating, testing, and tuning of the models, as described in more detail below.

As shown in FIG. 3, a historic dataset 302 may be generated. In an aspect, the historic dataset 302 may be all or a portion of the above-described historic data. During the sampling phase 310, the historic dataset 302 (or a portion thereof) may be divided into a training dataset and a testing dataset. In an aspect, random sampling may be used to generate the training and testing datasets, where a portion of the historic dataset is assigned to the training dataset and another portion of the historic dataset 302 is assigned to the testing dataset. The training dataset may be labelled such that each piece of data (e.g., data acquired from the one or more data sources 140 of FIG. 1) is associated with a particular label or set of labels indicative of the outcomes that should result from evaluation by the machine learning model. As described above, the training dataset and testing dataset may be subjected to various conditioning processes to prepare them for use with one or more machine learning models (e.g., for training purposes). In an aspect, the conditioning may be performed prior to generating the training and testing datasets.

The labelled and conditioned training dataset may be provided as an input to a vectorization phase 320. The vectorization phase 320 may be configured to generate a data structure that indicates characteristics of the training and testing datasets. For example, the vectorization phase 320 may generate a count vector of terms in each piece of data (e.g., terms in the dictionary described above with reference to FIG. 1) of the training and testing datasets. A term frequency-inverse document frequency (TF-IDF) technique may then be utilized to measure how frequently different terms appear in the datasets (e.g., TF-IDF is a numerical statistic that may be used to characterize the importance of terms found in a particular piece of data or a document from within a collection of data or documents).

Once the vectorization phase 320 is completed, a model selection phase 330 may be performed. During the model selection phase 330, one or more models may be selected for training and/or testing purposes. For example, the model selection phase 330 may utilize the outputs of the vectorization phase 320 (e.g., the count vectors and TF-IDF outputs) to configure or select different types of models (e.g., Naive Bayse, support vector machine algorithms, etc.) and perform fitting of outputs to the selected model(s). Once the models are selected and configured, outputs of the vectorization phase 320 associated with the training dataset may be evaluated against the models during a training and testing phase 340. As noted above, the training dataset may be associated with labeled data and thus, the outcomes that should be produced during the training and testing phase 340 may be evaluated to determine the accuracy of the model(s).

During a model finalization phase 350 and a model tuning phase 360, hyper parameters or other aspects of the models may be adjusted (e.g., to improve accuracy, performance, etc.). Once the finalization and tuning are completed, a prediction phase 370 may be executed, where predictions may be made using the finalized and tuned model(s). The predictions may indicate whether a particular piece of data indicates a risk or not, a risk categorization, etc. For example, the prediction phase 370 may produce prediction data 372. The model(s) performance may be evaluated using the testing dataset, where the accuracy of the tuned model(s) may be determined based on the prediction data 372. For example, the performance may be evaluated based on the number of correct classifications produced by the model. If the performance satisfies a threshold performance level (e.g., 70% correct, 80% correct, 85% correct, 90% correct, etc.), the model may be provided to a modelling tool (e.g., the modelling tool 120 of FIG. 1) for use in evaluating entity risk (e.g., live risk predictions and monitoring). If the model does not satisfy the threshold performance level, the training and testing datasets may be adjusted and the above-described process may be repeated the finalized model(s) satisfies the threshold performance level or until the model is determined to not be capable of satisfying the threshold performance level (e.g., because of insufficient training data, a different model should be selected, or some other reason). In the latter case, a new model may be selected, tested, validated, and finalized (e.g., tuned), subjected to the above-described testing and prediction/performance evaluation processes to determine whether the newly configured model provides the threshold level of performance. This cycle may repeat until a model providing the threshold performance level is achieved or it is determined that no model can achieve the threshold performance level, at which point the model providing the best performance may be selected.

It is noted that, while it may be possible that a model cannot be selected that provides the threshold level of performance, over time the ability to identify models that satisfy the threshold performance levels may be achieved as more training data is collected, which may provide for more robust learning by the selected models and the above-described training and testing operations. Thus, while the accuracy of a newly deployed system implementing techniques of the present disclosure may initially be below acceptable or desired levels, the ability to train the models over time may enable the system to become more accurate through additional training and eventually reach desired performance and accuracy levels. The models used to identify and categorize risks may be selected from a variety of model architectures. Thus, it is noted that while certain model architectures have been described herein, such description has been provided for purposes of illustration, rather than by way of limitation and other model architectures may be utilized by models in accordance with the concepts disclosed herein.

Figure 4:
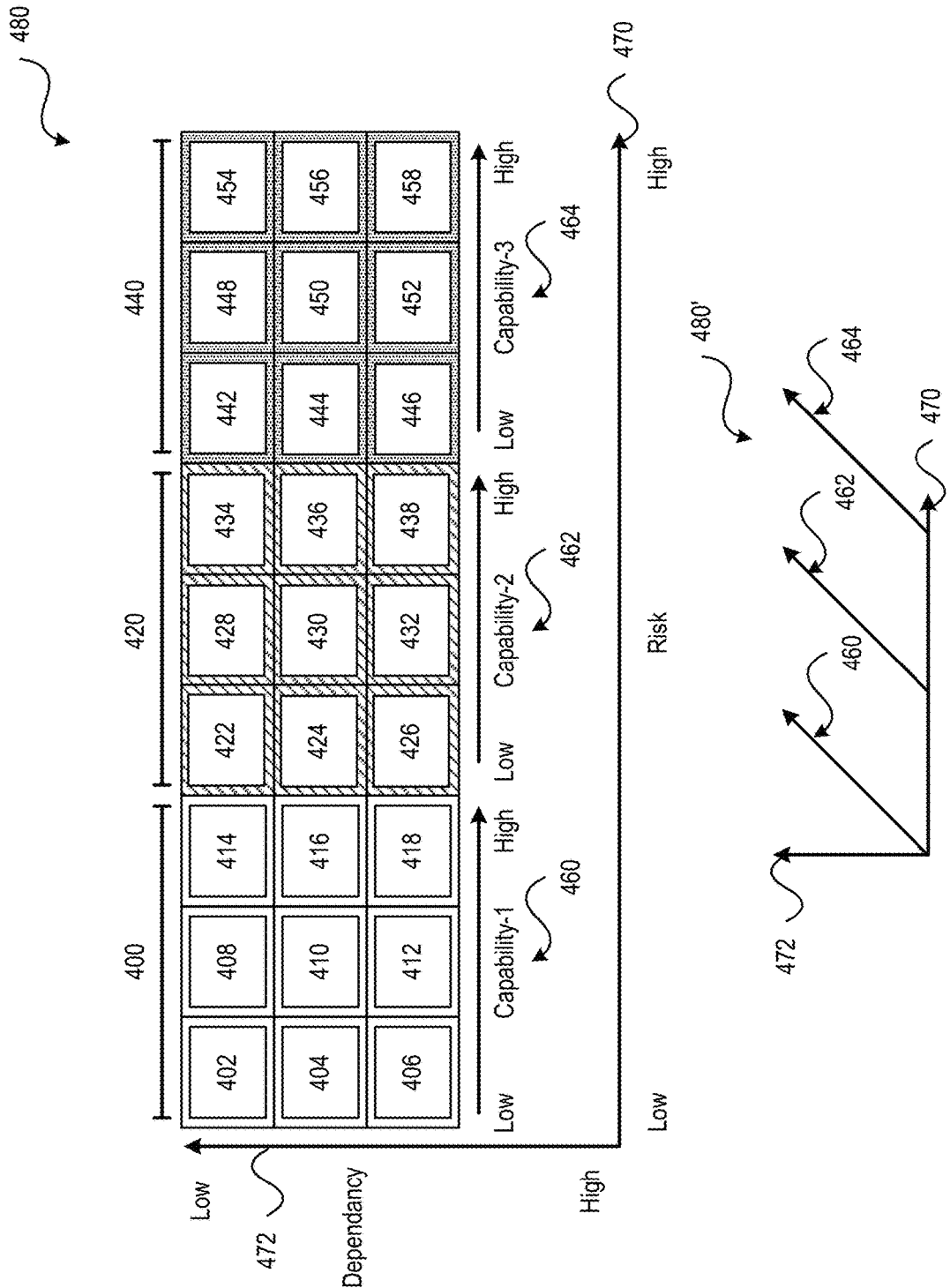
FIG. 4 is a block diagram illustrating operations to analyze third party risk in accordance with aspects of the present disclosure.

Referring to FIG. 4 is a block diagram illustrating an exemplary data structure that may be generated and utilized to analyze third party risk in accordance with aspects of the present disclosure is shown as a data structure 480. The data structure 480 may be presented to a user, as described above with reference to FIG. 1, an may present information in a manner that quantifies risks while taking into account capabilities and dependencies in accordance with the techniques disclosed herein. In FIG. 4, a first axis 470 (e.g., a horizontal axis) and a second axis 472 (e.g., a vertical axis) are shown and indicate different levels of risk (e.g., low, medium, high, etc.) associated with the data contained within the data structure 480. In particular, the information represented within the data structure 480 may represent an increased risk (or type of risk or risk category) moving across the data structure 480 (e.g., from left to right) such that risk information associated with data fields closer to the left side of the data structure 480 may represent a lower risk relative to risk information associated with data fields on the right side of the data structure 480. Additionally, the information represented within the data structure 480 may represent indicate dependency moving across the data structure 480 (e.g., from top to bottom) such that information or data fields closer to the top of the data structure 480 may represent a lower dependency relative to information or data fields on the bottom of the data structure 480.

As illustrated in FIG. 4, the data structure 480 may include different sections 400, 420, 440, which may be arranged (e.g., along the first axis 470) from left to right or lowest risk to highest risk. Each section 400, 420, 440 may include a plurality of fields associated with different types of risk and/or actions that may be performed to address any identified risks while taking into account capabilities and dependencies. For example, section 400 includes fields 402-418, section 420 includes fields 422-438, and section 440 includes fields 442-458. Each of sections 400, 420, 440 may be associated with an axis. For example, section 400 may be associated with axis 460, section 420 may be associated with axis 462, and section 440 may be associated with axis 440. Each of the axes 460, 462, 464 may indicate, for a corresponding section 400, 420, 440, information related to capabilities. For example, moving left to right on axes 460, 462, 464 may quantify capabilities with respect to each of the sections 400, 420, 440. In the example of FIG. 4, risk factors associated with capabilities may increase from left to right (e.g., risks with respect to capabilities may be lower on the left of each axes 460, 462, 464 and increase moving right within each section 400, 420, 440). In some aspects, the axes 460, 462, 464 may be axes in 3 dimensional space. For example, axes 470, 472 may represent an x axis and a y axis, respectively, and axes 460, 462, 464 may represent axes in 3 dimensional space that are perpendicular to the axes 470, 472 (e.g., in a z direction of a 3 dimensional space defined along an x, y, z coordinate space), as shown at 480'.

As an illustrative example of the utilization of the data structure 480 to evaluate risk, the scoring module 126 may calculate scores (e.g., risk scores, capability scores, dependency scores, etc.) during analysis of an input dataset (e.g., the input dataset 202 of FIG. 2) in connection with evaluating risk associated with a particular entity, such as a supplier, vendor, and the like. Once calculated, the score(s) may be utilized to quantify risk via generation of the data structure 480. In the exemplary illustration of FIG. 4, the data structure 480 is an RCD cube and as explained above may quantify risk. To illustrate, suppose that the modelling tool 120 was utilized to analyze and quantify risk for three different entities, such as entity 170A, entity 170B, and 170C of FIG. 1, and that the field 408 was associated with entity 170A, field 446 was associated with entity 170B, and field 442 was associated with entity 170C.

As explained above, each of the fields 402-418, 422-438, 442-458 may be associated with different types of risks and may include information regarding actions that may be taken to address the associated risk(s). For example, in section 400: field 402 may be associated with an action for supplier diversification; field 404 may be associated with an action for evaluating and configuring key performance indicators (KPIs); field 406 may be associated with an action for training; field 408 may be associated with no action needed; field 410 may be associated with an action for decreasing terms of one or more contracts (e.g., use of short term contracts with service level agreements (SLAs)); field 412 may be associated with an action for monitoring; field 414 may be associated with an action for supplier diversification; field 416 may be associated with an action for adjusting volume of business with a supplier, vendor, etc. (e.g., increasing purchase orders to a vendor with high capabilities to counteract or mitigate capability-related risks of another vendor); and field 418 may be associated with an action for increasing terms of one or more contracts (e.g., utilizing long term contracts).

In section 420: field 422 may be associated with a termination action (e.g., issuing a statement of termination of work to one or more vendors); field 424 may be associated with an action for diversification (e.g., diversifying suppliers to reduce dependency risks and/or capability risks); field 426 may be associated with an acquisition action (e.g., a directed buy, etc.); field 428 may be associated with an action for imposing a penalty (e.g., enforcing penalty or liability clauses in contracts, etc.); field 430 may be associated with an action for evaluating KPIs; field 432 may be associated with a protective action (e.g., requesting a performance bond, insurance, etc.); field 434 may be associated with an action for evaluating performance (e.g., conducting an audit, escalating an order or findings from an audit for resolution, etc.); field 436 may be associated with an action for intelligence gathering and prediction; and field 438 may be associated with an action for monitoring.

It is noted that while both of fields 404 and 430 in the example above relate to actions for evaluating KPIs, the KPI evaluations may be focused on different KPIs and/or different types of evaluations of the KPIs. To illustrate, as between sections 400 and 420, field 404 may represent lower risk and lower capabilities as compared to field 430, which may represent comparatively higher risk and higher capabilities than field 404. Thus, evaluation of KPIs in connection with field 404 may relate to evaluation of KPIs for a lower capability, lower dependency supplier, while evaluation of the KPIs in connection with field 430 may relate to evaluation of KPIs for a medium capability (e.g., per axis 462), medium risk (e.g., per axes 470) supplier. As a result of evaluation of the KPIs at fields 404, 430, the KPIs may be adjusted to for the low capability supplier to increase risk and thus, a recommendation to diversify with respect to low capability suppliers (e.g., so as to not create a higher level of risk due to the low capabilities of the supplier), while for a medium capability supplier the evaluation may result in a different set of recommendations or modifications to the risk analysis. It is noted that the non-limiting examples for evaluating KPIs described above have been provided for purposes of illustration, rather than by way of limitation and that other evaluations and evaluation outcomes may be readily implemented in accordance with the concepts disclosed herein. Accordingly, evaluation of KPIs, as described with reference to fields 404 and 430, should not be limited to the specific examples disclosed herein and should instead be interpreted to illustrate that the risk analysis framework of the present disclosure provides flexibility in evaluating risk and responses to identified risks based on dependencies and capabilities of the entities involved.

Similarly, it is noted that fields 412 and 438 are described above as both relating to actions for monitoring supplier risks. The particular monitoring actions performed in response to fields 412 and 438 may be different based on the levels of risk presented and the capabilities and dependencies of the involved entity or entities. For example, periodic monitoring may be performed for suppliers associated with lower dependency or higher capability based on field 412 while continuous monitoring may be performed for suppliers representing comparatively higher risk (e.g., due to higher dependency or lower capability) based on field 438. Additionally, the monitoring between fields 412 and 438 may additionally or alternatively differ with respect to the type of monitoring performed. For example, monitoring based on field 412 may be associated with monitoring supplier performance while monitoring based on field 438 may be associated with monitoring supplier risk. It is noted that the non-limiting examples for performing monitoring described above have been provided for purposes of illustration, rather than by way of limitation and that other types of monitoring may be readily implemented in accordance with the concepts disclosed herein.

In section 440: field 442 may be associated with an action for a termination action (e.g., issuing a statement of termination of work to one or more vendors); field 444 may be associated with an action for changing operations (e.g., starting a joint venture with a new supplier, etc.); field 446 may be associated with an action for resource management (e.g., identifying substitute uses for components, alternative components, etc.); field 448 may be associated with an action for supplier diversification; field 440 may be associated with an action for resource acquisition (e.g., identifying alternate sources for materials, components, and the like); field 452 may be associated with an action for imposing a penalty (e.g., enforcing penalty or liability clauses in contracts, etc.); field 454 may be associated with an action for imposing a penalty (e.g., enforcing penalty or liability clauses in contracts, etc.); field 456 may be associated with an action for evaluating performance (e.g., conducting an audit, escalating an order or findings from an audit for resolution, etc.); and field 458 may be associated with an action for intelligence gathering and prediction.

Keeping the non-limiting and exemplary actions associated with the fields 402-418, 422-438, 442-458 of data structure 480 identified above in mind, suppose that the score(s) for entity 170A were associated with field 446, the score(s) for entity 170B were associated with field 408, and the score(s) for entity 170B were associated with field 442. Using the data structure 480, which may be displayed within a graphical user interface to a user (e.g., a user of user device 150 of FIG. 1), the user may be able to detect that entities 170A, 170C present high risks (e.g., due to the score(s) for those entities being in section 440 of data structure 480) and that entity 170B presents a low risk (e.g., due to the score of entity 170B being in section 400 of data structure 480). Moreover, the user would be able to determine that entity 170A represents the highest risk since the score(s) for entity 170A is higher on the dependency risk scale (e.g., axis 472) as compared to the score(s) for entities 170B, 170C. As explained in the example above, field 446, corresponding to entity 170A, may be associated with an action for resource management (e.g., identifying substitute uses for components, alternative components, etc.); field 442, corresponding to entity 170C, may be associated with an action for a termination action (e.g., issuing a statement of termination of work to one or more vendors); and field 408, corresponding to entity 170B, may be associated with no action needed. Based on the actions corresponding to the fields associated with each of the mapped scores for the entities 170A, 170B, 170C, the user may quickly determine that no action is needed to address risks associated with entity 170B, that risks associated with entity 170A may be addressed by performing the substitution or repurposing action (e.g., finding an alternative use of components or materials supplied by the entity 170A, a substitute component or material for a component or material supplied by the entity 170A, etc.), and risks associated with the entity 170C should be addressed by termination of a contract with the entity 170C.

As can be appreciated from the description above, analyzing and evaluating risks using the system 100 and generating the data structure 480 based on analysis and evaluation of the risks may enable risks to be identified, quantified, and presented to a user in a manner that enables meaningful actions to be taken to address and mitigate risks. In particular, the analysis and evaluation of risk by the system 100 of FIG. 1 leverages functionality of the modeling tool 120 to capture a dataset of information from one or more data sources (e.g., the one or more data sources 140 of FIG. 1) that includes fresh data associated with one or more target entities of interest, such as the entities 170A, 170B, 170C of FIG. 1. Additionally, leveraging the dataset reduction techniques, machine learning techniques, and scoring techniques described above enables the analysis to be performed in a manner that provides improved repeatability and accuracy with respect to identification of risks as compared prior techniques, which primarily relied on stale data (e.g., financial data) and manual analysis techniques. Furthermore, the functionality provided by the system 100 enables risk to be identified and quantified while taking into account capabilities and dependencies which are not presently considered in currently available risk identification and analysis techniques, thereby providing new insights into the types of risk and enabling risks to be more accurately quantified. Moreover, generation of the data structure 480 based on the analysis provides a manner of quantifying identified risks (e.g., on a spectrum of low to high risk) and correlating identified risks with actions to mitigate the risks in a manner that enables users to take meaningful and timely action to address identified risks.

Figure 5:
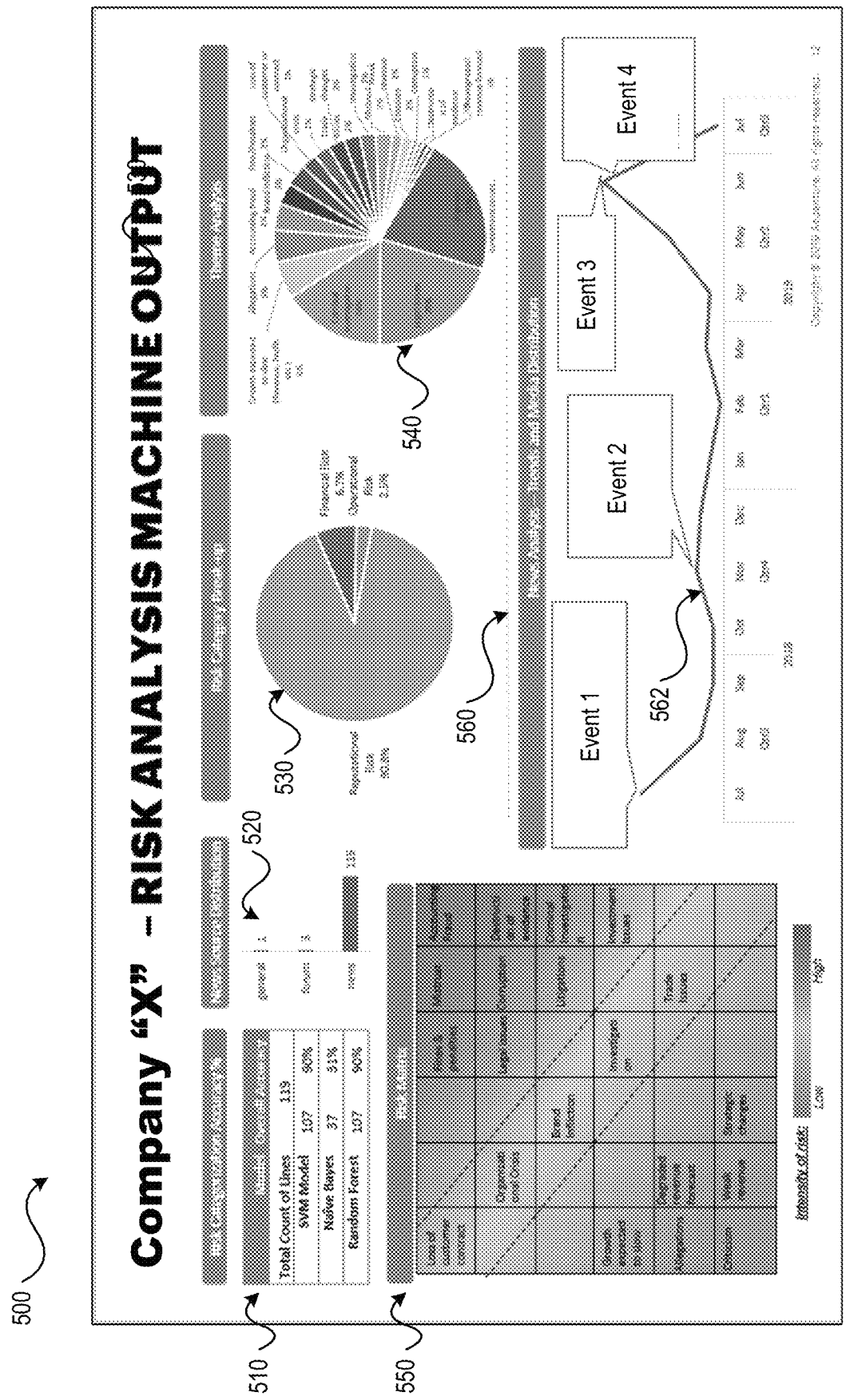
FIG. 5 is a screenshot illustrating aspects of a tool for detecting and quantifying third party risk in accordance with aspects of the present disclosure.

Referring to FIG. 5 is a screenshot illustrating aspects of a tool for detecting and quantifying third party risk in accordance with aspects of the present disclosure is shown as a user interface 500. In an aspect, the user interface 500 may be provided by a modelling tool, such as the modelling tool 120 of FIG. 1. In additional or alternative aspects, the user interface 500 may be provided via other techniques, such as via a web browser, a web browser-based application (e.g., a plug-in, etc.), a standalone application operating in a client-server architecture with a risk analysis device (e.g., the risk analysis device 110 of FIG. 1 or the cloud-based risk analysis device 162 of FIG. 1). Irrespective of its particular implementation, the user interface 500 may present various types of information related to risk of one or more entities to a user.

As shown in FIG. 5, the user interface 500 may include various sections or regions 510, 520, 530, 540, 550, 560. The regions 510, 520, 530, 540, 550, 560 may present information related to training of machine learning models utilized by the risk analysis device. For example, region 510 may present information about risk categorization accuracy (e.g., the accuracy of risk categorization processes described above) and may include information regarding a count of lines analyzed by the model (e.g., information indicative of a size of the dataset) and different types of models being evaluated. In the particular screenshot shown in FIG. 5, the model types include a SVM model, a Naive Bayes model, and a random forest model, with the accuracy indicated as 90%, 31%, and 90% respectively. The region 520 may present information regarding the makeup of the dataset (e.g., indicate the number of pieces of data included in the dataset obtained from each data source).

The region 530 may present information related to different types of risk categories identified and region 540 shows information related to different themes identified during the analysis (e.g., growth expected to slow, allegations, accounting fraud, fines/penalties, etc.). In some aspects, the percentage makeup of the different categories or themes may be shown in addition to a text-based identification of the information conveyed in regions 530, 540. It is noted that while FIG. 5 shows the information presented in regions 530, 540 as a pie chart, other types of representations may also be utilized.

Region 550 may present a risk matrix that identifies different types of risk that have been identified. In an aspect, the matrix may be color coded using a gradient that indicates an intensity or degree of risk associated with each different type of risk indicated in the matrix. For example, the diagonal of the matrix (e.g., from the upper left to lower right) may represent a medium risk zone and may be associated with a first color of a selected color coding scheme (e.g., yellow). Risks indicated in the portion above the diagonal may represent a high risk zone, indicated by a second color of the selected color coding scheme (e.g., red), and risks indicated below the diagonal may represent a low risk zone, indicated by a third color of the color coding scheme (e.g., green). Region 560 may present information related to trends and media distribution based on the analyzed dataset. To illustrate, the region 560 may present a graph or plot 562 representing a timeline of the input dataset, with the different trajectories (or magnitude) of the plot 562 corresponding to the volume of pieces of data obtained from the data sources over time. In an aspect, excerpts of risk-related data may also be presented within the region 560, which as shown in FIG. 5 as "Event 1", "Event 2", "Event 3", and "Event 4". The particular placement of excerpts along the plot 562 may correspond to a point in time when each "event" took place (e.g., the article was published, etc.). In some aspects, markers (e.g., dots, etc.) may be placed on the plot 562 and a user may click on or hover over the markers to trigger display of the different "events".

Figure 6:
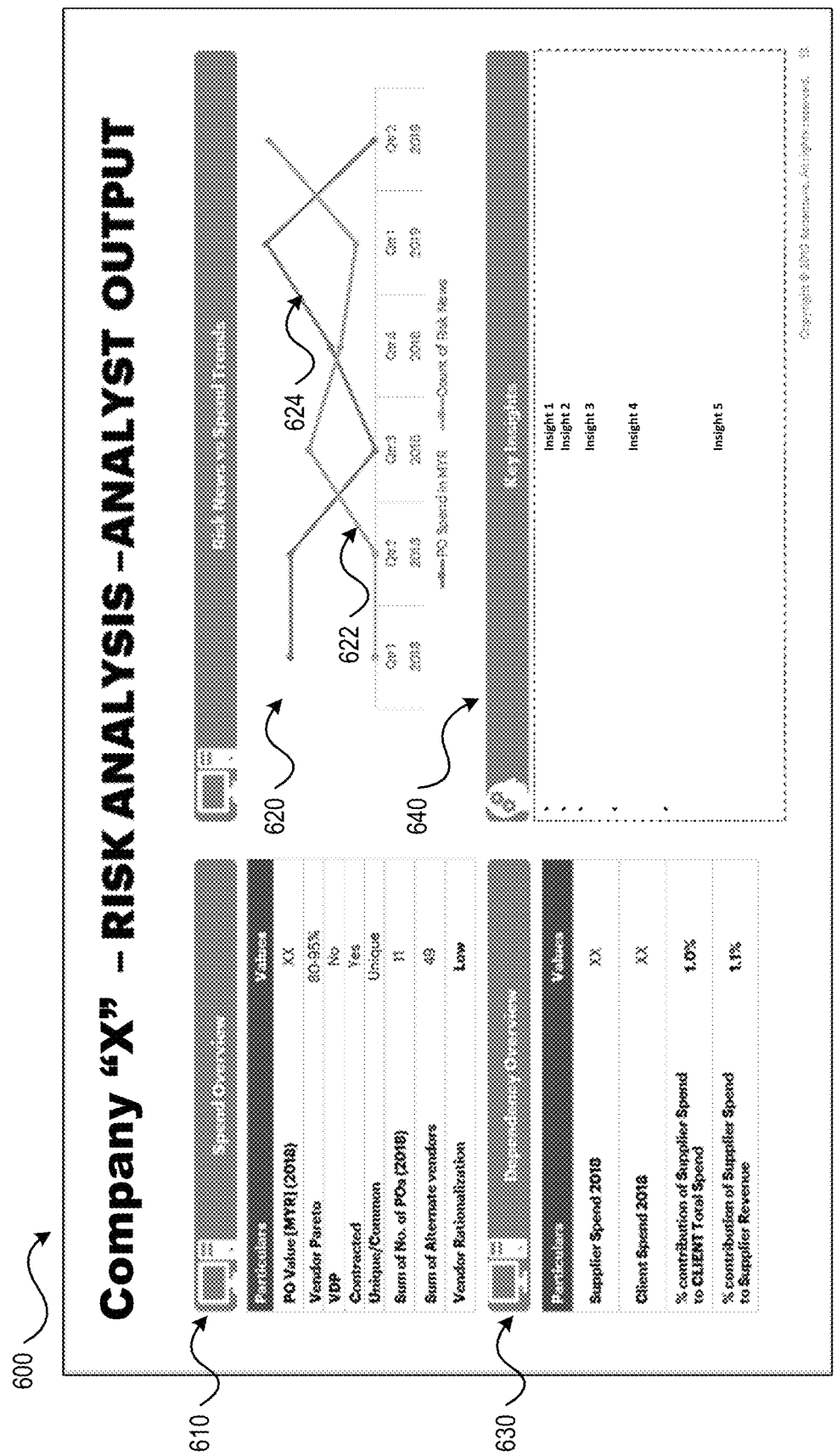
FIG. 6 is another screenshot illustrating aspects of a tool for detecting and quantifying third party risk in accordance with aspects of the present disclosure.

Referring to FIG. 6 is another screenshot illustrating aspects of a tool for detecting and quantifying third party risk in accordance with aspects of the present disclosure is shown as a user interface 600. In an aspect, the user interface 600 may be provided by a modelling tool, such as the modelling tool 120 of FIG. 1. In additional or alternative aspects, the user interface 600 may be provided via other techniques, such as via a web browser, a web browser-based application (e.g., a plug-in, etc.), a standalone application operating in a client-server architecture with a risk analysis device (e.g., the risk analysis device 110 of FIG. 1 or the cloud-based risk analysis device 162 of FIG. 1). Irrespective of its particular implementation, the user interface 600 may present various types of information related to risk of one or more entities to a user.

As shown in FIG. 6, the user interface 600 may include various sections or regions 610, 620, 630, 640. The regions 610, 620, 630, 640 may present information related to dependency information. For example, region 610 may present information regarding a purchase order (PO) spend (e.g., value for a period of time, number of POs, whether the vendor associated with the POs is contracted, etc.). The information presented in region 610 may be indicative of a dependency between an entity under analysis (e.g., one of the entities 170A, 170B, 170C of FIG. 1) and an entity conducting or requesting the risk analysis (e.g., the entity conducting or requesting the analysis may issue POs to one or more of the entities 170A, 170B, 170C).

Region 620 may present information associated with obtained data compared to spending trends. For example, in region 620 a plot 622 may correspond to spending (e.g., POs issued to a particular entity) and a plot 624 may correspond to a volume of data obtained over time (e.g., a volume of pieces of data obtained from the one or more data sources over time). Region 630 may present information providing an overview of dependency related factors, such as an amount spent with one or more entities under consideration, which may be presented in terms of a dollar amount and/or as a percentage (e.g., a percentage of money spent with a particular entity as compared to total spend, revenue, and the like). Region 640 may present information associated with insights associated with spending trends, dependencies, and the like.

Figure 7:
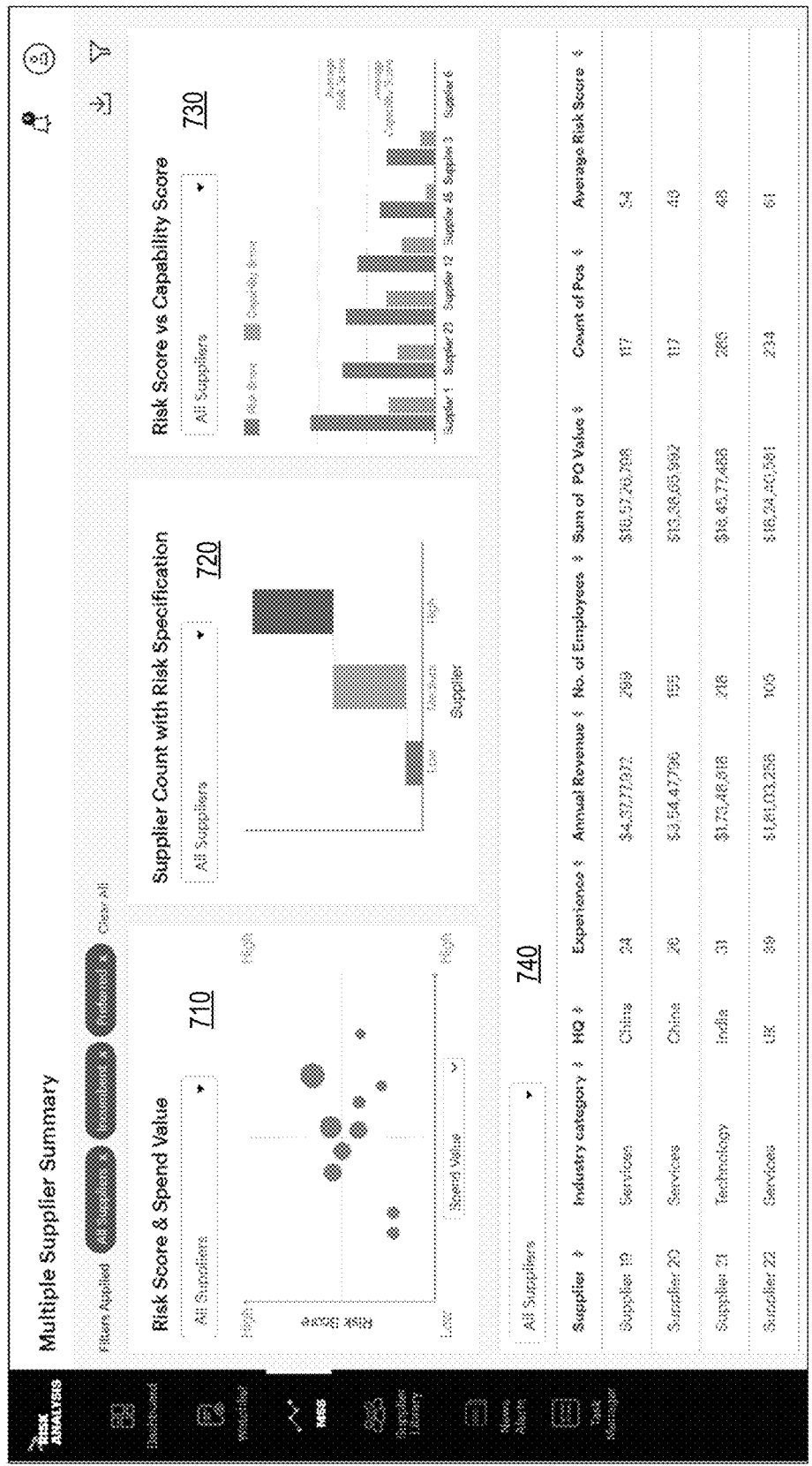
FIG. 7 is another screenshot illustrating aspects of a tool for detecting and quantifying third party risk in accordance with aspects of the present disclosure.

Referring to FIG. 7 is another screenshot illustrating aspects of a tool for detecting and quantifying third party risk in accordance with aspects of the present disclosure is shown as a user interface 700. In an aspect, the user interface 700 may be provided by a modelling tool, such as the modelling tool 120 of FIG. 1. In additional or alternative aspects, the user interface 700 may be provided via other techniques, such as via a web browser, a web browser-based application (e.g., a plug-in, etc.), a standalone application operating in a client-server architecture with a risk analysis device (e.g., the risk analysis device 110 of FIG. 1 or the cloud-based risk analysis device 162 of FIG. 1). Irrespective of its particular implementation, the user interface 700 may present various types of information related to risk of one or more entities to a user.

As shown in FIG. 7, the user interface 700 may include various sections or regions 710, 720, 730, 740. The regions 710, 720, 730, 740 may present information related to risks associated with multiple entities under consideration. To illustrate, region 710 may present information related to risk scores and spend value. Region 710 may include a dropdown menu that enables all entities (e.g., suppliers) to be selected or a subset of the entities. Region 720 may present information associated with risk types (e.g., low, medium, high, etc.) for the different entities. As described with reference to region 710, a dropdown menu or other form of control may be provided to enable all entities or a subset of entities to be selected for inclusion in the data presented in region 720. The different sizes of the bars shown in region 720 may represent a number of identified risks or risk factors identified during analysis for all or the selected subset of entities.

Region 730 may display information comparing calculated risk scores and calculated capability scores (e.g., scores determined by the scoring module 126 of FIG. 1) for the different entities or the subset of entities. The scores may be plotted or shown as bars (e.g., in a bar chart), as shown in FIG. 7, or another type of visual representation (e.g., plots as in region 620 of FIG. 2). Region 740 may display information related to characteristics of a relationship between each entity and a third party (e.g., an entity conducting the analysis). For example, the information presented in region 740 may indicate the name of each entity, an industry category associated with each entity, a location of the entity's headquarters, a metric indicative of experience of the entities (e.g., in years, months, etc.), annual revenue (or another financial metric), a number of employees for each entity, a sum of POs issued to each entity, a count of the POs, an average risk score for each entity, or other types of metrics. It is noted that the specific examples of information shown in the user interface 700 have been provided for purposes of illustration, rather than by way of limitation and that other types of information may be presented to the user.

Figure 8:
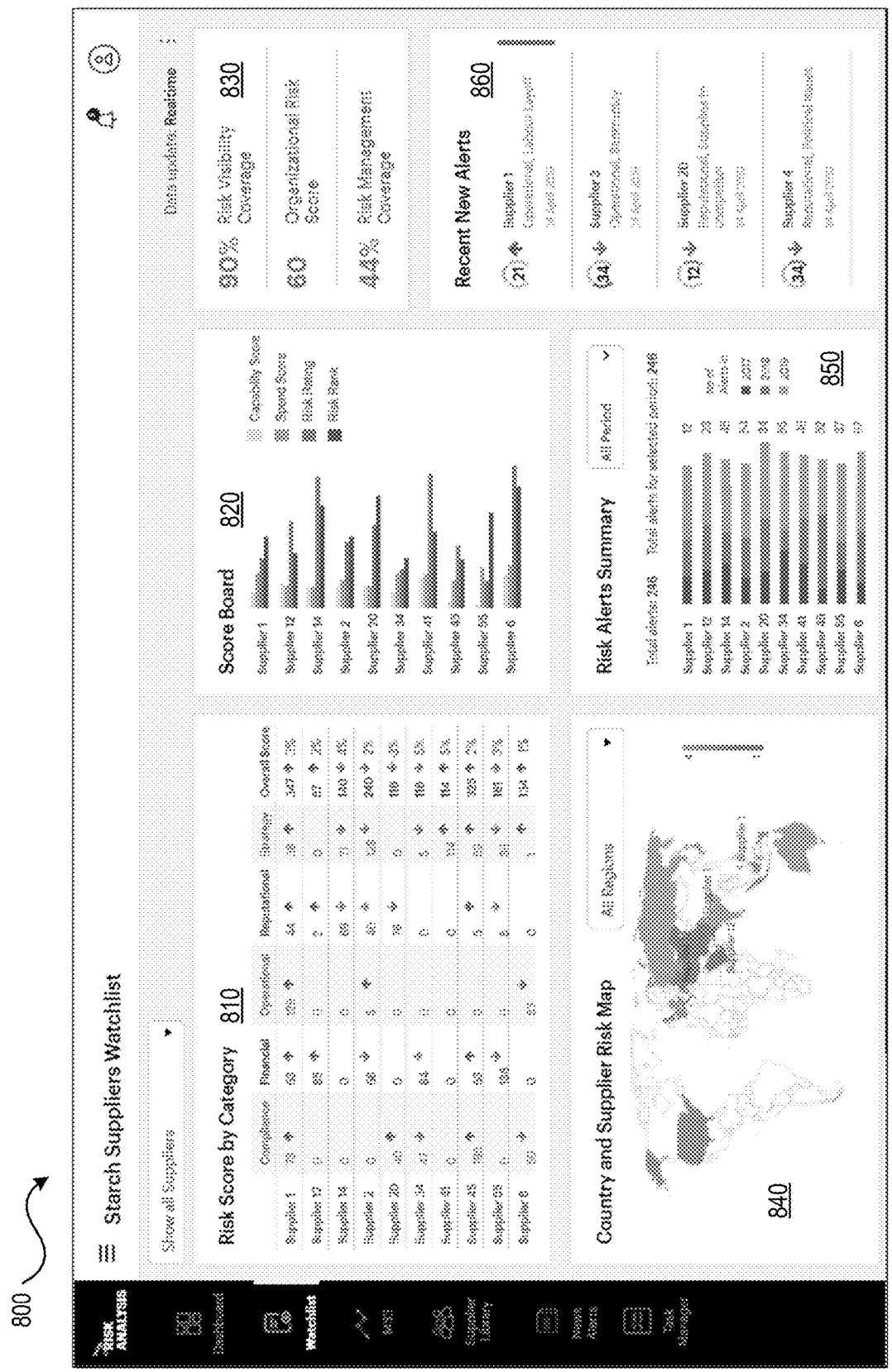
FIG. 8 is another screenshot illustrating aspects of a tool for detecting and quantifying third party risk in accordance with aspects of the present disclosure.

Referring to FIG. 8 is another screenshot illustrating aspects of a tool for detecting and quantifying third party risk in accordance with aspects of the present disclosure is shown as a user interface 800. In an aspect, the user interface 800 may be provided by a modelling tool, such as the modelling tool 120 of FIG. 1. In additional or alternative aspects, the user interface 800 may be provided via other techniques, such as via a web browser, a web browser-based application (e.g., a plug-in, etc.), a standalone application operating in a client-server architecture with a risk analysis device (e.g., the risk analysis device 110 of FIG. 1 or the cloud-based risk analysis device 162 of FIG. 1). Irrespective of its particular implementation, the user interface 700 may present various types of information related to risk of one or more entities to a user.

As shown in FIG. 8, the user interface 800 may include various sections or regions 810, 820, 830, 840, 850, 860. The regions 810, 820, 830, 840, 850, 860 may present information related to entities being monitored by a risk analysis device in accordance with aspects of the present disclosure. For example, region 810 may present risk score information for a variety of entities (e.g., all or a subset of entities as configured via the dropdown menu in the top left of user interface 800) across various risk categories (e.g., compliance risk, financial risk, operational risk, reputational risk, strategy risk, overall risk, and the like). The information presented in region 810 may also include a trend indicator for each risk score, such as the up and down arrows shown in FIG. 8 (e.g., up arrows may represent increased risk scores and down arrows may represent decreased risk scores). In some aspects, the trend indicators may also be color coded (e.g., red arrows indicating increased risk and down arrows indicating decreased risk). It is noted that while the trend indicators are shown as arrows in FIG. 8, other techniques may also be used to indicate risk score trends, such as color coding the score values (e.g., red text indicating increased risk and down text indicating decreased risk) or other techniques.

Region 820 may present information comparing scores of the different entities for various types of scoring metrics, such as a capability score, spend score, risk rating, risk rank, etc. In the exemplary interface shown in FIG. 8, the scoring metrics are shown as bars with color coding applied to represent the different scoring metrics. However, it is noted that the use of color coded bars has been provided for purposes of illustration, rather than by way of limitation and the scoring metrics may be presented in any other manner suitable for conveying the scoring metrics in a manner that allows comparative evaluation of the scoring metrics for the indicated entities. Region 830 may provide information regarding organizational risk and risk assessment coverage (e.g., an estimate of risk visibility, an estimate of risk being managed, etc.). Region 840 may present a map that identifies regions where the entities are located and may be color coded to signify risks in each region. As shown in FIG. 8, region 840 may provide a dropdown menu (or another form of menu) that enables particular regions to be selected for display.

Region 850 may be configured to present information regarding risk alerts for each monitored entity. In some aspects, the information presented in region 850 may be may be configured to display information regarding risk alerts over a defined period of time (e.g., a particular year, month, week, day, etc.) or all periods of time. The defined period of time may be configured using an interactive element, shown in FIG. 8 as a dropdown menu. The risk alert information may be presented as a bar chart, shown in FIG. 8, or another visual representation or format. Region 850 may also be configured to color code the visual representation to show different sub-units of time, such as to color code different portions of the visual representation for different time periods (e.g., each different color coded section of the visual representation may represent a number of alerts sent in the corresponding period of time or sub-unit thereof). Region 860 may be configured to display recent risk alerts. It is noted that while regions 850, 860 both present information regarding risk alerts, the alert information presented in region 860 may include information regarding aspects of the risk associated with the alert, an indication of whether the alert(s) represents an increased risk or a decreased risk, and may enable the user to view the alert (e.g., by clicking on a link or other interactive element associated with each identified alert).

Using the user interface 800 may enable a user to monitor one or more entities and risks associated with those entities. The alerts may enable the user to view (e.g., in real-time or on an ad-hoc basis) new and emerging risks associated with the monitored entities, track risks associated with the monitored entities over time, and evaluate whether identified risks (e.g., risks associated with new risk alerts presented in region 860) require further action. In some aspects, when viewing a new risk alert one or more actions may be presented and the user may initiate the one or more actions to mitigate the risk from the user interface (e.g., via interacting with interactive elements presented in a displayed alert message).

Figure 9:
FIG. 9 is another screenshot illustrating aspects of a tool for detecting and quantifying third party risk in accordance with aspects of the present disclosure.

Referring to FIG. 9 is another screenshot illustrating aspects of a tool for detecting and quantifying third party risk in accordance with aspects of the present disclosure is shown as a user interface 900. In an aspect, the user interface 900 may be provided by a modelling tool, such as the modelling tool 120 of FIG. 1. In additional or alternative aspects, the user interface 900 may be provided via other techniques, such as via a web browser, a web browser-based application (e.g., a plug-in, etc.), a standalone application operating in a client-server architecture with a risk analysis device (e.g., the risk analysis device 110 of FIG. 1 or the cloud-based risk analysis device 162 of FIG. 1). Irrespective of its particular implementation, the user interface 900 may present various types of information related to risk of one or more entities to a user.

As shown in FIG. 9, the user interface 900 may include various sections or regions 910, 920, 930, 940. The regions 910, 920, 930, 940 may present information related to management of one or more tasks for mitigating identified risks. Region 910 may present information regarding a summary of tasks, such as tasks approved (e.g., for execution, completion), tasks raised (e.g., tasks to be completed approved), tasks received (e.g., tasks for evaluation), or other types of risk mitigation tasks and tasks statuses. Region 920 may present information that indicates a status of the various tasks presented in the region 910. For example, region 910 shows a summary of three different types of tasks and region 920 shows three bars, each bar corresponding to one of the three different types of task in region 910. Furthermore, each bar in region 920 may indicate a status of the different tasks (e.g., green for completed tasks, yellow for in-progress tasks, orange for pending tasks, and red for overdue tasks).

Region 930 may present information associated with different action categories, such as mandatory and optional tasks, and may also indicate whether any tasks are related to contractual obligations or not. Region 940 may present a detailed overview of each task and may include interactive elements (e.g., buttons, links, etc.) that enable a user to edit the task, mark the task as completed, etc. As shown in FIG. 9, region 940 may include icons that indicate a status of each task, an identifier associated with each task, an entity to which each task relates, a task description, a risk category, a date the task was assigned, an identifier associated with the user that raised the task, an identifier associated with the user assigned to the task, an identifier associated with a user that approved the task for execution, and a date the task is to be completed. Additionally, region 940 may provide multiple tabs that enable the user to view detailed overviews of each task in the different types of tasks (e.g., a separate tab for received, approved, raised, completed tasks, etc.) and from each tab a user may be able to edit, view, comment, provide attachments, mark a task as complete, or other actions by interacting with interactive elements within the region 940. It is noted that the exemplary pieces of information shown in region 940 of FIG. 9 have been provided for purposes of illustration, rather than by way of limitation and that other types of information or less information may be presented in region 940 depending on the particular configuration of the user interface 900.

Figure 10:
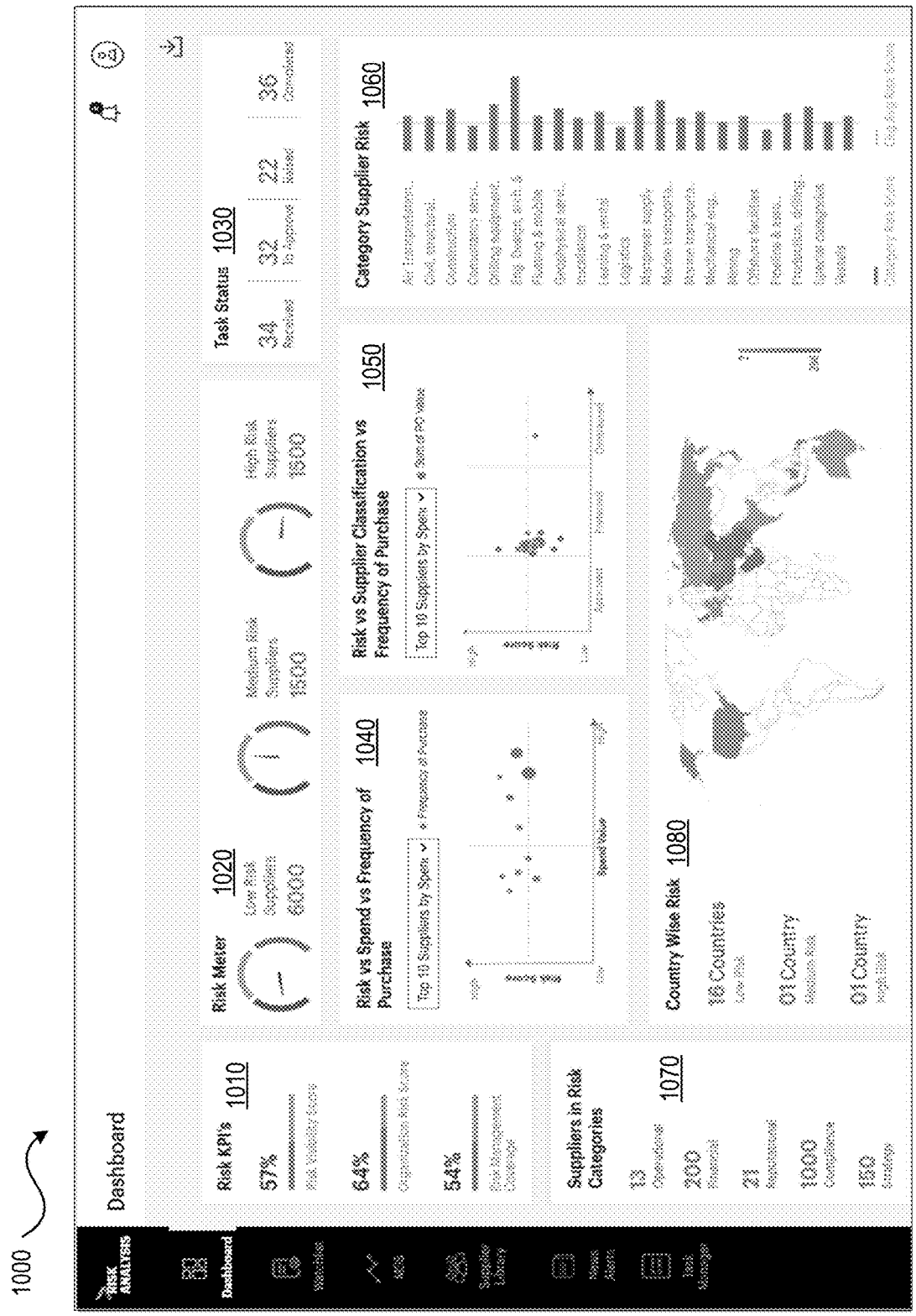
FIG. 10 is another screenshot illustrating aspects of a tool for detecting and quantifying third party risk in accordance with aspects of the present disclosure and FIG. 11 is a flow diagram illustrating an example of a method for detecting and quantifying third party risk in accordance with aspects of the present disclosure.

Referring to FIG. 10 is another screenshot illustrating aspects of a tool for detecting and quantifying third party risk in accordance with aspects of the present disclosure is shown as a user interface 1000. In an aspect, the user interface 1000 may be provided by a modelling tool, such as the modelling tool 120 of FIG. 1. In additional or alternative aspects, the user interface 1000 may be provided via other techniques, such as via a web browser, a web browser-based application (e.g., a plug-in, etc.), a standalone application operating in a client-server architecture with a risk analysis device (e.g., the risk analysis device 110 of FIG. 1 or the cloud-based risk analysis device 162 of FIG. 1). Irrespective of its particular implementation, the user interface 1000 may present various types of information related to risk of one or more entities to a user.

As shown in FIG. 10, the user interface 1000 may be a dashboard interface and may include various sections or regions 1010, 1020, 1030, 1040, 1050, 1060, 1070, 1080. The regions 1010, 1020, 1030, 1040, 1050, 1060, 1070, 1080 may present information providing an overview of the various types of information described above with reference to the user interfaces of FIGS. 5-9. For example, region 1010 may present information related to one or more risk KPIs. Region 1020 may present risk meters (or another type of representation) associated with different entity risk levels. For example, each meter shown in region 1020 may indicate (e.g., from left to right) a number of entities associated with low risks, medium risks, and high risks.

Region 1030 may provide a summary of task information (e.g., the task information associated with user interface 900 of FIG. 9). Region 1040 may present information associated with comparative risk versus spend versus frequency of purchase for all or a selected number of entities (e.g., entities selected via a dropdown menu or other controls), and region 1050 may present information associated with comparative risk versus entity classification versus frequency of purchase for all or a selected number of entities (e.g., entities selected via a dropdown menu or other controls). Region 1060 may provide an overview of different risk categories. Region 1070 may present information associated with a number of entities in each risk categories. Region 1080 may provide a map showing a graphical representation of risk by geographic region (e.g., similar to region 840 of user interface 800 of FIG. 8).

As shown above with reference to FIGS. 5-10, risk analysis devices of the present disclosure provide robust tools for viewing and understanding risks across diverse geographic regions and enables a user to identify, assess, and address different types of risks, as well as view information about particular entities associated with each different type of risk. The dashboard (e.g., of FIG. 10) and other user interfaces also provide users with functionality to monitor risk in real-time or in an on-demand manner, including providing alerts to users when new risks are identified. In some aspects, the alerts may include recommended actions, such as the actions (or tasks) described above with respect to the data structure 480 of FIG. 4. Using the graphical user interface tools described above, users may approve the actions for execution, assign the actions to appropriate users for execution, and track and monitor the status of the assigned tasks for completion or other issues. The tracking and monitoring capabilities provided by the various interfaces described above represents an improvement over prior systems by providing enhanced abilities to view and quantify risk in a manner that users can understand and in a manner that provides more rapid detection of risk. Furthermore, by leveraging the machine learning techniques described above, risks may be identified and quantified more rapidly, enabling users to take action to mitigate risks more quickly as compared to prior risk identification techniques, which relied on stale data and manual detection using different analysis techniques than those disclosed herein.

Figure 11:
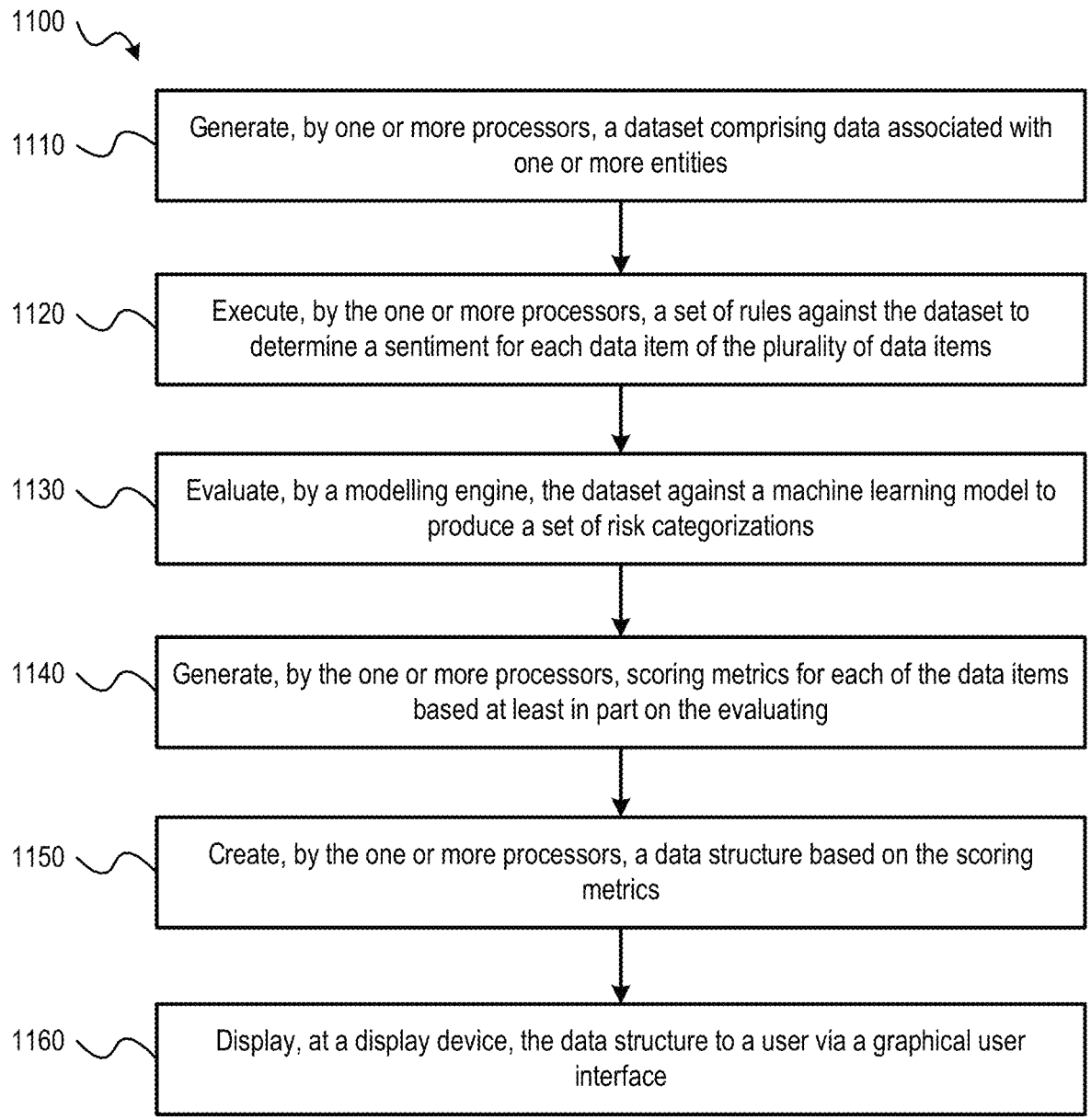

Referring to FIG. 11, a flow diagram illustrating an example of a method for detecting and quantifying risk in accordance with aspects of the present disclosure is shown as a method 1100. In an aspect, the method 100 may be performed by a risk analysis device, such as the risk analysis device 110 of FIG. 1. Moreover, steps of the method 1100 may be stored as instructions (e.g., the instructions 116 of FIG. 1) that, when executed by one or more processors (e.g., the one or more processors 112 of FIG. 1), cause the one or more processors to perform operations for detecting and quantifying risk in accordance with the concepts described herein. Furthermore, it is noted that the method 1100 may also be provided as a service, such as via the cloud-based risk analysis device 162 of FIG. 1 or software executing on or accessible to (e.g., via a web browser) a user device, such as the user device 150 of FIG. 1.

At step 1110, the method 100 includes generating, by one or more processors, a dataset comprising data associated with one or more entities. As described above, the dataset may include a plurality of data items obtained from one or more data sources (e.g., the one or more data sources 140 of FIG. 1). In an aspect, the dataset may be generated automatically. In an additional or alternative aspect the dataset may be generated in response to a command from a user, such as a request to retrieve fresh data from the one or more data sources. It is noted that when compiled automatically, such as may occur when a risk analysis device is configured to monitor risk, the frequency at which data is retrieved may be configured by the requesting user and/or based on a type of the data sources involved in generating the dataset.

At step 1120, the method 100 includes executing, by the one or more processors, a set of rules against the dataset to determine a sentiment for each data item of the plurality of data items. As described above, the set of rules may include a dictionary or other set of terms (e.g., unigrams, bigrams, etc.) associated with positive and negative sentiment. In some aspects, the sentiment of the data items may be used to reduce or prune the dataset, such as to remove or flag data items associated with positive sentiment, negative sentiment, or both, which may reduce the size of the dataset and enable subsequent operations to be performed more rapidly and efficiently.

At step 1130, the method 100 includes evaluating, by a modelling engine, the dataset against a machine learning model to produce a set of risk categorizations. As described above, the set of risk categorizations may associate a risk category (or categories) with data items of the plurality of data items. At step 1140, the method 100 includes generating, by the one or more processors, scoring metrics for each of the data items based at least in part on the evaluating. The scoring metrics may be configured to take into account an impact of dependencies and capabilities of the one or more entities on risks corresponding to the risk categorizations. For example, the data items may be evaluated or scored as described above to determine risk scores, dependency scores, and capability scores. At step 1150, the method 100 includes creating, by the one or more processors, a data structure based on the scoring metrics. As explained above, the data structure may be configured to quantify risks identified for each entity of the one or more entities and to identify actions configured to mitigate the risks for each entity. The data structure may quantify risks based on dependencies, risks, and capabilities, as described above with reference to FIGS. 1 and 4.

At step 1160, the method 100 includes displaying, at a display device, the data structure to a user via a graphical user interface. In an aspect, the graphical user interface may include one or more of the user interfaces shown in FIGS. 5-10. As described above, the graphical user interface may include interactive elements enabling the user to initiate one or more actions identified in the data structure, as described above. As shown above, the method 1100 provides an improved technique for identifying and quantifying risk. For example, unlike previous techniques which relied on stale data, such as periodic financial statements, the method 1100 utilizes a data retrieval process to retrieve fresh data from one or more data sources (e.g., the one or more data sources 140 of FIG. 1). Utilizing fresh data may enable more accurate identification of risks and may enable risk to be identified sooner (e.g., in real-time or near real-time). Another advantage provided by the method 1100 is the use of sentiment data, which may reduce the dataset, allowing the analysis to be performed more efficiently (e.g., reduced computing resources, time, etc.) and reducing noise in the data being analyzed, which may improve accuracy of risk identification. Also, by utilizing machine learning techniques to identify or categorize risks, risks may be more accurately identified or detected as compared to the subjective and manual techniques presently used, which are based primarily on financial data. Moreover, the risk analysis techniques disclosed herein enable risk to be quantified while taking into account dependencies and capabilities, which are not accounted for in presently available risk analysis techniques.

The method 1100 and the operations and functionality disclosed herein may be particular advantageous to particular industries where dependencies and capabilities may be present. For example, in the manufacturing industry a manufacturer may utilize a plurality of suppliers or vendors to manufacture products. Some of the vendors may produce parts, components, or materials that the manufacturer then incorporates into a final product, and the ability of the manufacturer to source the parts, components, or materials from the suppliers may directly present a risk to the manufacturer. Using the techniques disclosed herein enables the dependency of the manufacturer on the different suppliers to be considered, as well as the capabilities of the suppliers. For example, if a supplier is experiencing a labor shortage the capability of the supplier to deliver needed quantities of the parts, components, or materials to the manufacturer may present a risk to the manufacturer. Using the techniques disclosed herein, the dependency of the manufacturer on the supplier may be evaluated and taken into account based on the capabilities and risks of the supplier. In particular, in the event that a risk of being unable to source sufficient quantities of the parts, components, or materials from the supplier is detected, the disclosed techniques may indicate that the supplier is or is not dependent on the supplier and appropriate actions may be recommended to mitigate the impact that those risks may have on the manufacturer. For example, the actions may indicate that alternative sources of the parts, components, or materials are available and a recommendation to order the parts, components, or materials from the alternative source may be presented to the user, thereby minimizing the risk that insufficient quantities of the parts, components, or materials are acquired by the manufacturer. It is noted that while the manufacturing industry is discussed in the example above, the techniques disclosed herein may be readily applied to other industries and the description of the impact of the disclosed techniques on the manufacturing industry has been provided for purposes of illustration, rather than by way of limitation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-3 and 11) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for identifying and mitigating risks in a network, the method comprising:

receiving, by one or more processors, a historic dataset and a current dataset from one or more data sources via the network, wherein each of the historic dataset and the current dataset comprise data associated with one or more entities, and wherein each of the historic dataset and the current dataset comprise a plurality of data items obtained from the one or more data sources;

generating, by the one or more processors, a pruned dataset by using a first machine learning model for pruning the current dataset based on a sentiment of each data item of the plurality of data items of the current dataset, wherein the sentiment for each data item of the plurality of data items of the current dataset is determined based on executing a set of rules against the current dataset, wherein the set of rules includes a dictionary customized to the one or more entities, and the sentiment for a data item of the plurality of data items of the current data set is determined by:

associating a corresponding value to each term of a plurality of terms of the data item based on analysis of the data item with the dictionary; and determining the sentiment of the data item based on sum of corresponding values of the plurality of terms of the data item;

dividing, by a modelling engine, the historic dataset into a training dataset and a testing dataset;

evaluating, by the modelling engine, performance of a second machine learning model based on the testing dataset;

comparing, by the modelling engine, the performance of the second machine learning model with a threshold performance level to determine a result;

iteratively updating, by the modelling engine, the second machine learning model based on the result indicating that the second machine learning model is below the threshold performance level, wherein the iteration update of the second machine learning model comprises:

adjusting the training dataset and the testing dataset in a plurality of cycles; and
training and evaluating the second machine learning model based on the adjusted training dataset and the adjusted testing dataset in each of the plurality of cycles,
wherein the second machine learning model is iteratively updated to generate an updated second machine learning model, and
wherein the updated second machine learning model satisfies the threshold performance level;
evaluating, by the modelling engine, the pruned dataset against the updated second machine learning model to produce a set of risk categorizations, wherein the set of risk categorizations associate a risk category with each data item of the plurality of data items;
generating, by the one or more processors, scoring metrics for each of the plurality of data items based at least in part on the evaluating,
wherein the scoring metrics account for an impact of dependencies and capabilities of the one or more entities on the risks corresponding to the set of risk categorizations,
wherein the scoring metrics comprise risk scores, capability scores, and dependency scores,
wherein the risk scores indicate the risks related to the one or more entities,
wherein the capability scores indicate capabilities of the one or more entities, and
wherein the dependency scores evaluate aspects of a relationship between at least one of:
two or more different entities of the one or more entities, or
different portions of a single entity of the one or more entities;
creating, by the one or more processors, a data structure based on the scoring metrics,
wherein the data structure is configured to quantify the risks identified for each entity of the one or more entities and to identify actions configured to mitigate the risks for each entity,
wherein the data structure quantifies:
the risks corresponding to the risk scores along a first axis of a three-dimensional space,
the dependencies corresponding to the dependency scores on a second axis of the three-dimensional space, and
the capabilities corresponding to the capability scores along a third axis of the three-dimensional space; and
displaying, at a display device, the data structure to a user via a graphical user interface, wherein the graphical user interface comprises interactive elements enabling the user to initiate one or more actions identified in the data structure.

2. The method of claim 1, wherein the pruning of the current dataset removes data items of the current dataset associated with positive sentiment, neutral sentiment, or both.

3. The method of claim 1, comprising removing duplicate data items from the current dataset.

4. The method of claim 1, wherein the data structure comprises a matrix of actions configured to mitigate the identified risks.

5. The method of claim 1, wherein generating the scoring metrics comprises associating one or more weights with parameters corresponding to one or more risk categories, and wherein each of the plurality of data items is associated with a particular risk category of the one or more risk categories based on the evaluating.

6. The method of claim 1, wherein the data structure includes a plurality of sections corresponding to the three-dimensional space, and wherein each section of the plurality of sections includes information of an action of the one or more actions, based on a corresponding location of each section with respect to the three-dimensional space.

7. The method of claim 1, wherein the plurality of data items of the dataset is associated with a plurality of risk categories based on the set of risk categorizations, and the method further comprising:
determining an intensity of data items of the plurality of data items corresponding to each risk category of the plurality of risk categories;
determining a frequency of appearance of each risk category of the plurality of risk categories within the pruned dataset; and
determining the risk score based on the determined intensity of the data items and the determined frequency of the appearance of each risk category of the plurality of risk categories.

8. A system for identifying and mitigating risk in a network, the system comprising:
a memory; and
one or more processors communicatively coupled to the memory, the one or more processors configured to:
receive a historic dataset and a current dataset from one or more data sources via the network, wherein each of the historic dataset and the current dataset comprise data associated with one or more entities, and wherein each of the historic dataset and the current dataset comprise a plurality of data items obtained from the one or more data sources;
generate a pruned dataset by using a first machine learning model for pruning the current dataset based on a sentiment of each data item of the plurality of data items of the current dataset, wherein the sentiment for each data item of the plurality of data items of the current dataset is determined based on executing a set of rules against the current dataset, wherein the set of rules includes a dictionary customized to the one or more entities, and
the sentiment for a data item of the plurality of data items of the current dataset is determined by:
associating a corresponding value to each term of a plurality of terms of the data item based on analysis of the data item with the dictionary; and
determining the sentiment of the data item based on sum of corresponding values of the plurality of terms of the data item;
divide the historic dataset into a training dataset and a testing dataset;
evaluate performance of a second machine learning model based on the testing dataset;
compare the performance of the second machine learning model with a threshold performance level to determine a result;
iteratively update the second machine learning model based on the result indicating that the second machine learning model is below the threshold performance level, wherein the iteration update of the second machine learning model comprises:
adjusting the training dataset and the testing dataset in a plurality of cycles; and training and evaluating the second machine learning
model based on the adjusted training dataset and
the adjusted testing dataset in each of the plurality
of cycles,
wherein the second machine learning model is iteratively updated to generate an updated second
machine learning model, and
wherein the updated second machine learning model
satisfies the threshold performance level;
evaluate the pruned dataset against the second machine
learning model to produce a set of risk categorizations, wherein the set of risk categorizations associate a risk category with each data item of the
plurality of data items;
generate scoring metrics for each of the plurality of
data items based at least in part on the evaluating,
wherein the scoring metrics account for an impact of
dependencies and capabilities of the one or more
entities on the risks corresponding to the set of risk
categorizations,
wherein the scoring metrics comprise risk scores,
capability scores, and dependency scores,
wherein the risk scores indicate the risks related to
the one or more entities,
wherein the capability scores indicate capabilities of
the one or more entities, and
wherein the dependency scores evaluate aspects of a
relationship between at least one of:
two or more different entities of the one or more
entities, or
different portions of a single entity of the one or
more entities;
create a data structure based on the scoring metrics,
wherein the data structure is configured to quantify
the risks identified for each entity of the one or
more entities and to identify actions configured to
mitigate the risks for each entity,
wherein the data structure quantifies:
the risks corresponding to the risk scores along a
first axis of a three-dimensional space,
the dependencies corresponding to the dependency scores on a second axis of the three-dimensional space, and
the capabilities corresponding to the capability
scores along a third axis of the three-dimensional space; and
display the data structure to a user via a graphical user
interface, wherein the graphical user interface comprises interactive elements enabling the user to initiate one or more actions identified in the data
structure.

9. The system of claim 8, wherein the pruning of the
current dataset removes data items of the current dataset
associated with positive sentiment, neutral sentiment, or
both.

10. The system of claim 8, comprising removing duplicate
data items from the current dataset.

11. The system of claim 8, wherein the data structure
comprises a matrix of actions configured to mitigate the
identified risks.

12. The system of claim 8, wherein generating the scoring
metrics comprises associating one or more weights with
parameters corresponding to one or more risk categories,
and wherein each of the plurality of data items is associated
with a particular risk category of the one or more risk
categories based on the evaluating.

13. The system of claim 8, wherein the one or more
processors are configured to periodically retrieve the plurality of data items from the one or more data sources.

14. A non-transitory computer-readable storage medium
storing instructions that, when executed by one or more
processors, cause the one or more processors to perform
operations for identifying and mitigating risk in a network,
the operations comprising:
receiving a historic dataset and a current dataset from one
or more data sources via the network, wherein each of
the historic dataset and the current dataset comprise
data associated with one or more entities, and wherein
each of the historic dataset and the current dataset
comprise a plurality of data items obtained from the
one or more data sources;
generating a pruned dataset by using a first machine
learning model for pruning the current dataset based on
a sentiment of each data item of the plurality of data
items of the current dataset, wherein the sentiment for
each data item of the plurality of data items of the
current dataset is determined based on executing a set
of rules against the current dataset, wherein
the set of rules includes a dictionary customized to the
one or more entities, and
the sentiment for a data item of the plurality of data
items of the current dataset is determined by:
associating a corresponding value to each term of a
plurality of terms of the data item based on
analysis of the data item with the dictionary; and
determining the sentiment of the data item based on
sum of corresponding values of the plurality of
terms of the data item;
dividing the historic dataset into a training dataset and a
testing dataset;
evaluating performance of a second machine learning
model based on the testing dataset;
comparing the performance of the second machine learning model with a threshold performance level to determine a result;
iteratively updating the second machine learning model
based on the result indicating that the second machine
learning model is below the threshold performance
level, wherein the iteration update of the second
machine learning model comprises:
adjusting the training dataset and the testing dataset in
a plurality of cycles; and
training and evaluating the second machine learning
model based on the adjusted training dataset and the
adjusted testing dataset in each of the plurality of
cycles,
wherein the second machine learning model is iteratively updated to generate an updated second
machine learning model, and
wherein the updated second machine learning model
satisfies the threshold performance level;
evaluating the pruned dataset against the second machine
learning model of using a modelling engine to produce
a set of risk categorizations, wherein the set of risk
categorizations associate a risk category with each data
item of the plurality of data items;
generating scoring metrics for each of the plurality of data
items based at least in part on the evaluating,
wherein the scoring metrics account for an impact of
dependencies and capabilities of the one or more
entities on the risks corresponding to the set of risk
categorizations, wherein the scoring metrics comprise risk scores, capability scores, and dependency scores, and wherein the dependency scores evaluate aspects of a relationship between at least one of:
two or more different entities of the one or more entities, or
different portions of a single entity of the one or more entities;

creating a data structure based on the scoring metrics, wherein the data structure is configured to quantify the risks identified for each entity of the one or more entities and to identify actions configured to mitigate the risks for each entity, wherein the data structure quantifies:
the risks corresponding to the risk scores along a first axis of a three-dimensional space,
the dependencies corresponding to the dependency scores on a second axis of the three-dimensional space, and
the capabilities corresponding to the capability scores along a third axis of the three-dimensional space; and displaying the data structure to a user via a graphical user interface, wherein the graphical user interface comprises interactive elements enabling the user to initiate one or more actions identified in the data structure.

15. The non-transitory computer-readable medium of claim 14, wherein the pruning of the current dataset removes data items of the current dataset associated with positive sentiment, neutral sentiment, or both.

16. The non-transitory computer-readable medium of claim 14, wherein the data structure comprises a matrix of actions configured to mitigate identified risks, and wherein displaying the data structure comprises associating a risk identified with a particular entity with one of the actions.

17. The non-transitory computer-readable medium of claim 14, wherein the one or more entities comprise one or more vendors supplying products, components, or materials to a manufacturer, and wherein the risks for each entity correspond to risks to the manufacturer.

* * * * *